United States Patent [19]

McCumber et al.

[11] Patent Number: 4,560,293
[45] Date of Patent: Dec. 24, 1985

[54] DOCUMENT PRINTING METHOD AND APPARATUS

[75] Inventors: Roger D. McCumber, Minnetonka; Thomas L. Peterson, Lakeville; Gerry A. Lee, Prior Lake, all of Minn.

[73] Assignee: Check Technology Corporation, Eden Prairie, Minn.

[21] Appl. No.: 542,037

[22] Filed: Oct. 14, 1983

[51] Int. Cl.[4] .......................... B41J 5/30; G06F 11/00
[52] U.S. Cl. ......................................... 400/61; 400/76; 400/605; 101/232; 101/426; 271/9; 271/254; 271/262
[58] Field of Search ..................... 400/61, 69, 70, 76, 400/82, 605, 247, 248, 121; 101/93.22, 93.28, 93.29, 336, 232, 426; 83/678; 248/182, 184; 271/9, 225, 251, 253, 254, 255, 258, 263, 262; 283/58; 346/165

[56] References Cited

U.S. PATENT DOCUMENTS

| | | | |
|---|---|---|---|
| 2,801,849 | 8/1957 | Backhouse | 271/253 |
| 2,995,364 | 8/1961 | Frederick et al. | 271/251 |
| 3,194,154 | 7/1965 | McKeag | 101/426 |
| 3,194,157 | 7/1965 | McKeag | 101/426 |
| 3,212,381 | 10/1965 | Heyer | 83/678 |
| 3,576,367 | 4/1971 | Sable | 101/426 |
| 3,611,923 | 10/1971 | Haramia et al. | 101/93.28 |
| 3,753,560 | 8/1973 | Kapral et al. | 271/9 |
| 3,874,285 | 4/1975 | Kodaira et al. | 101/93.28 |
| 4,022,460 | 5/1977 | Pritchett | 271/258 |
| 4,220,081 | 9/1980 | Hawkinson | 101/93.28 |
| 4,238,982 | 12/1980 | Mock | 83/678 |
| 4,267,556 | 5/1981 | Fotland et al. | 346/165 |
| 4,363,477 | 12/1982 | Miyushita | 271/9 |
| 4,417,282 | 11/1983 | Yamamoto | 271/9 |
| 4,428,041 | 1/1984 | Honkawa | 271/263 |
| 4,440,389 | 4/1984 | Ames et al. | 271/251 |

FOREIGN PATENT DOCUMENTS

| | | | |
|---|---|---|---|
| 2261502 | 6/1973 | Fed. Rep. of Germany | 101/93.28 |
| 2507965 | 12/1982 | France | 400/82 |

OTHER PUBLICATIONS

"Document Aligner"; F. M. Diel et al; *IBM Technical Disclosure Bulletin*; vol. 19, No. 9, p. 3499; Feb. 1977.

*Primary Examiner*—Edgar S. Burr
*Assistant Examiner*—David A. Wiecking
*Attorney, Agent, or Firm*—Orrin M. Haugen; Thomas J. Nikolai

[57] ABSTRACT

A computer-controlled machine for printing business documents, such as, checks, check vouchers, check registers and other forms used in quantity. Paper stock of varying dimensions, color or other characteristics is loaded into individual hoppers or trays in a paper input module. Under computer control, predetermined numbers of sheets are extracted from the plural hoppers in a prescribed sequence and transported, in proper alignment, to a first printing station where alpha/numeric characters are printed on the paper sheets by means of a non-impact xerographic printer in accordance with preprogrammed instructions. Next, the partially completed documents are serially transported, again in proper alignment, to a further printing station where MICR characters are impressed on the sheets using a drum and hammer-type printer, again with format, spacing and positioning controlled by a preprogrammed microcomputer system. The thus prepared sheets are then deposited in an output hopper or, alternatively, are presented to a finishing station for binding.

28 Claims, 47 Drawing Figures

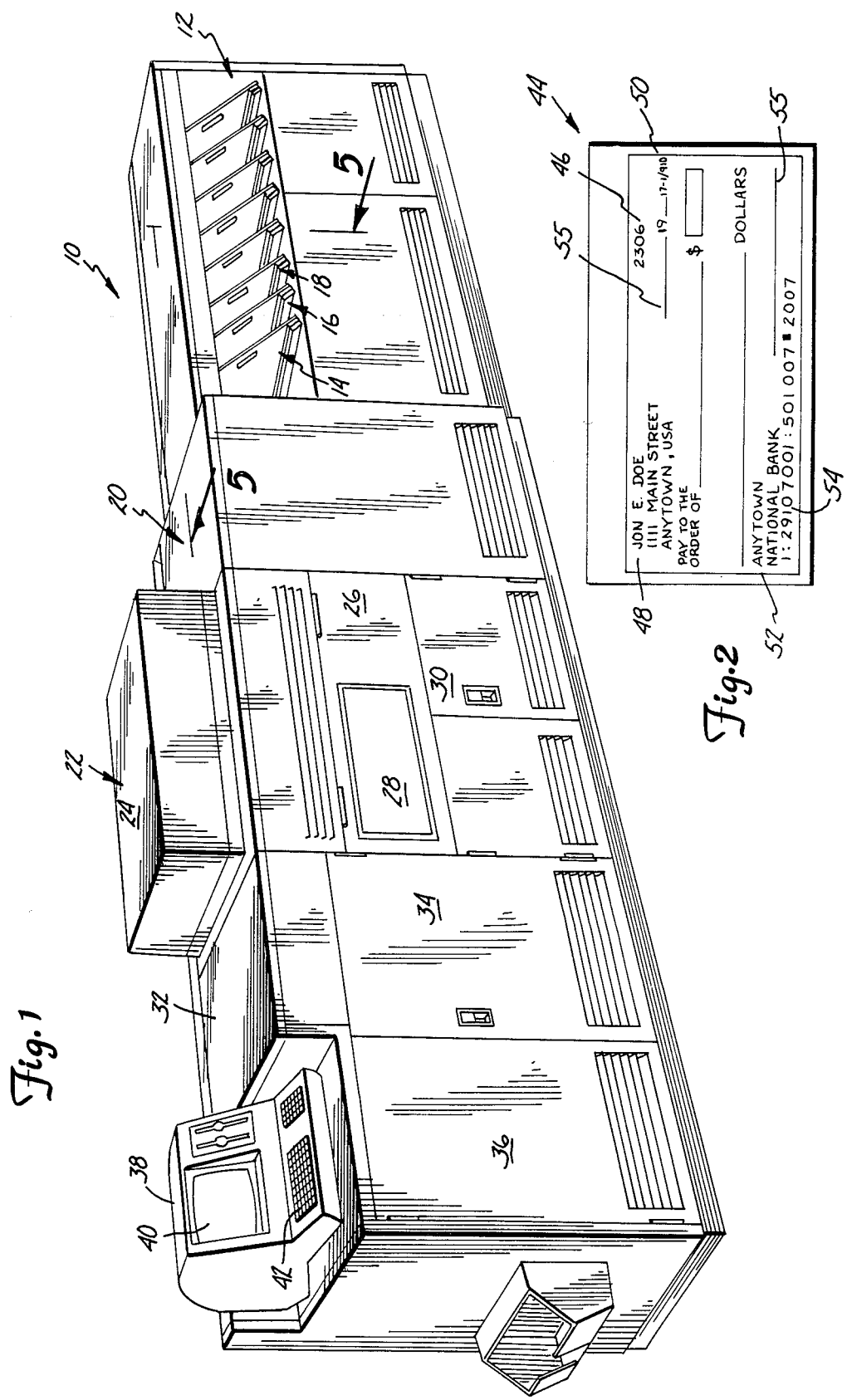

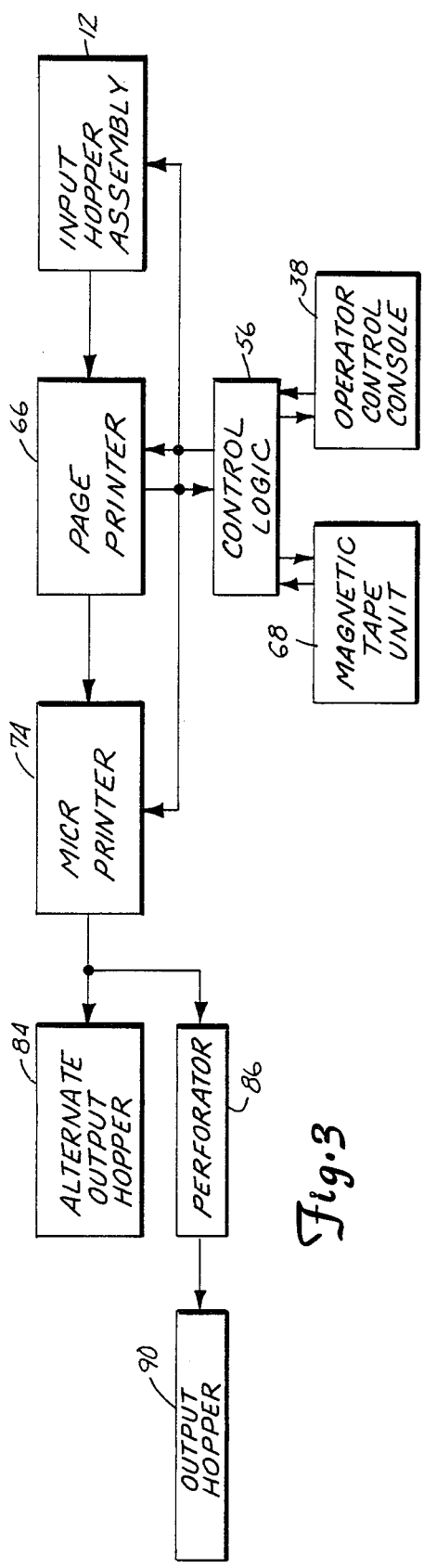
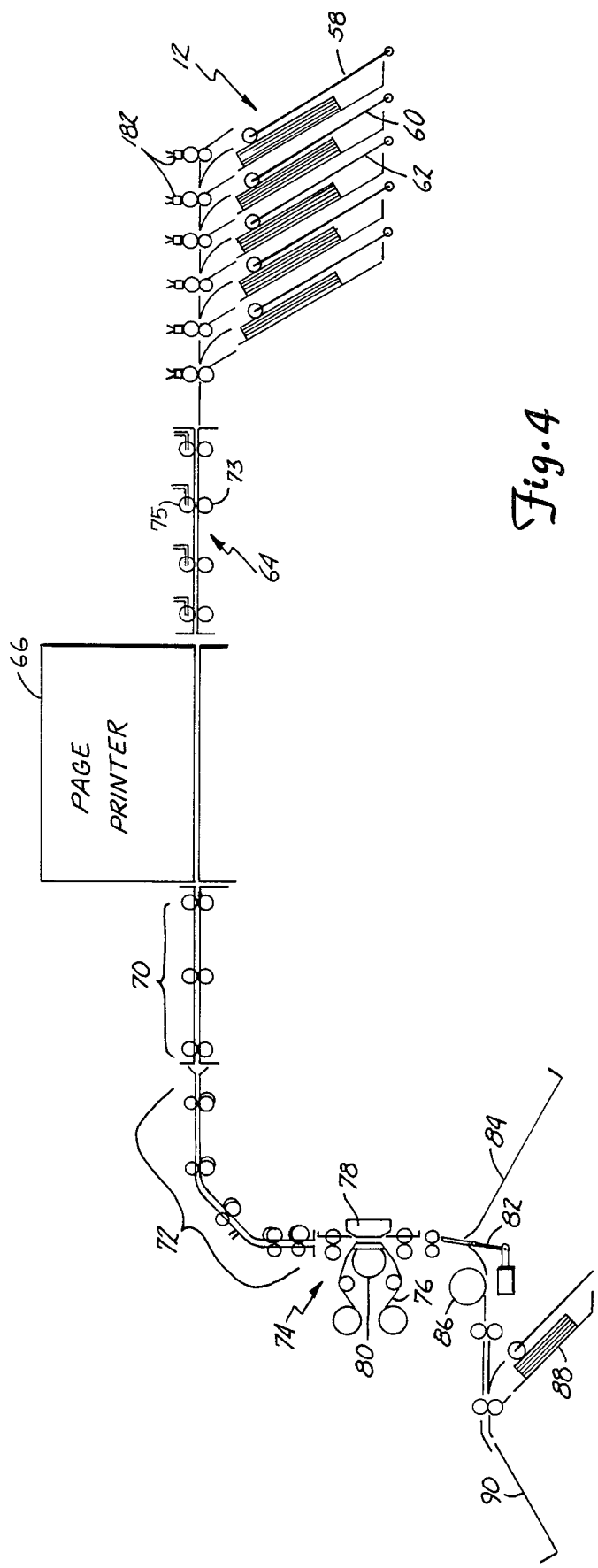
Fig. 3
Fig. 4

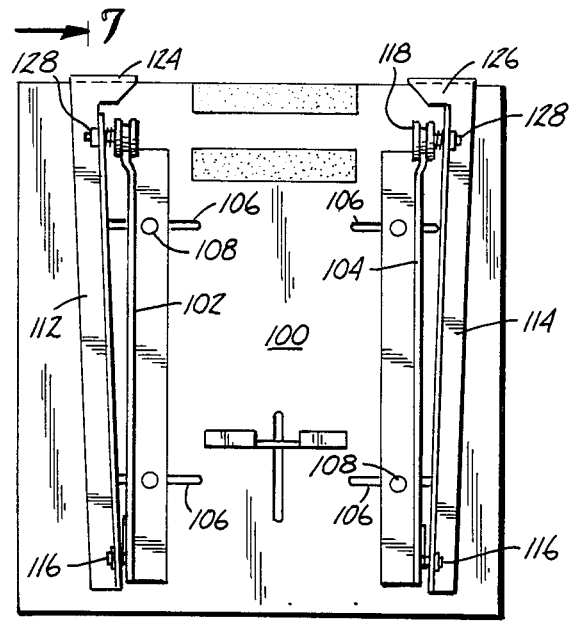
Fig. 6
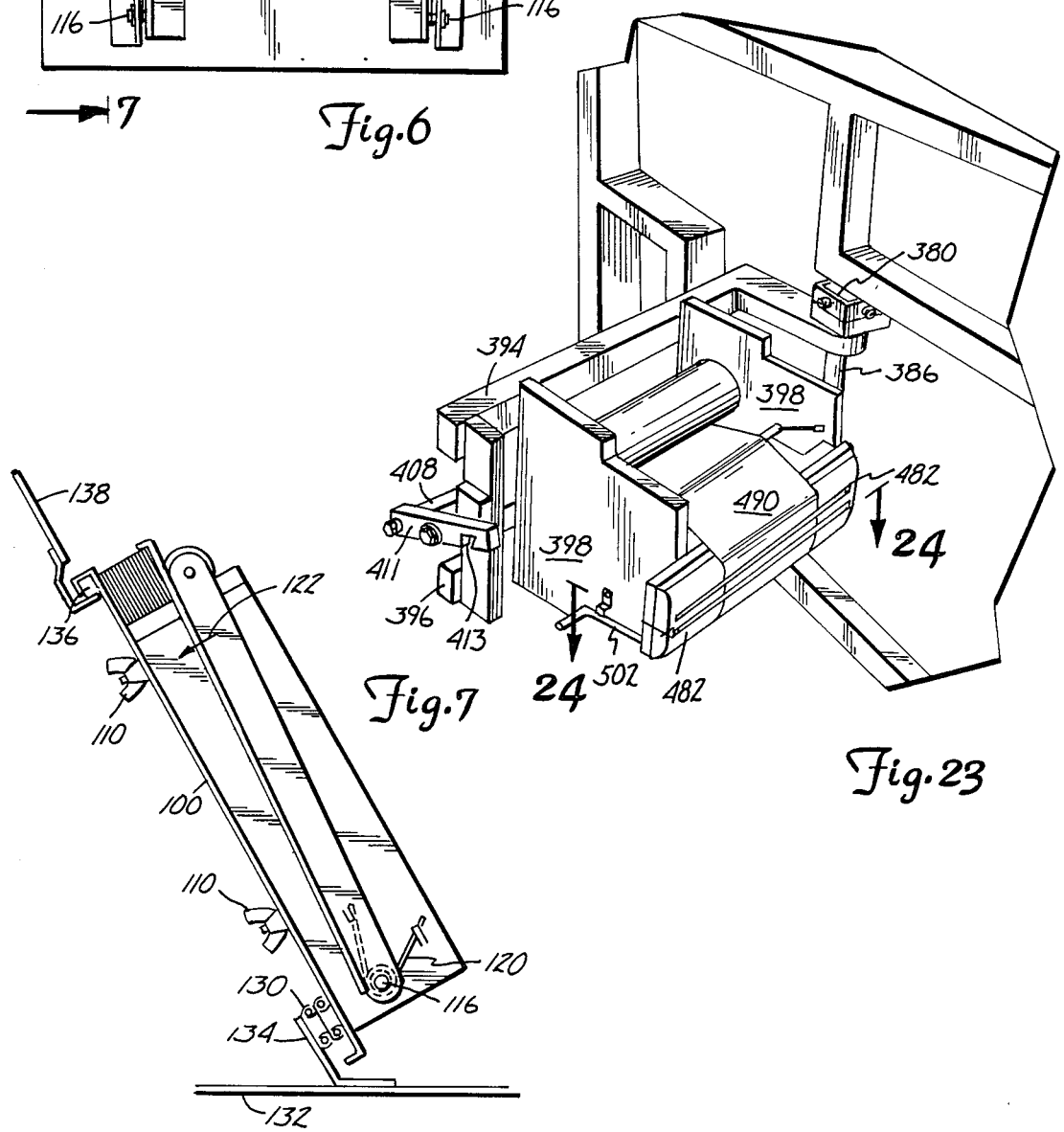
Fig. 7
Fig. 23

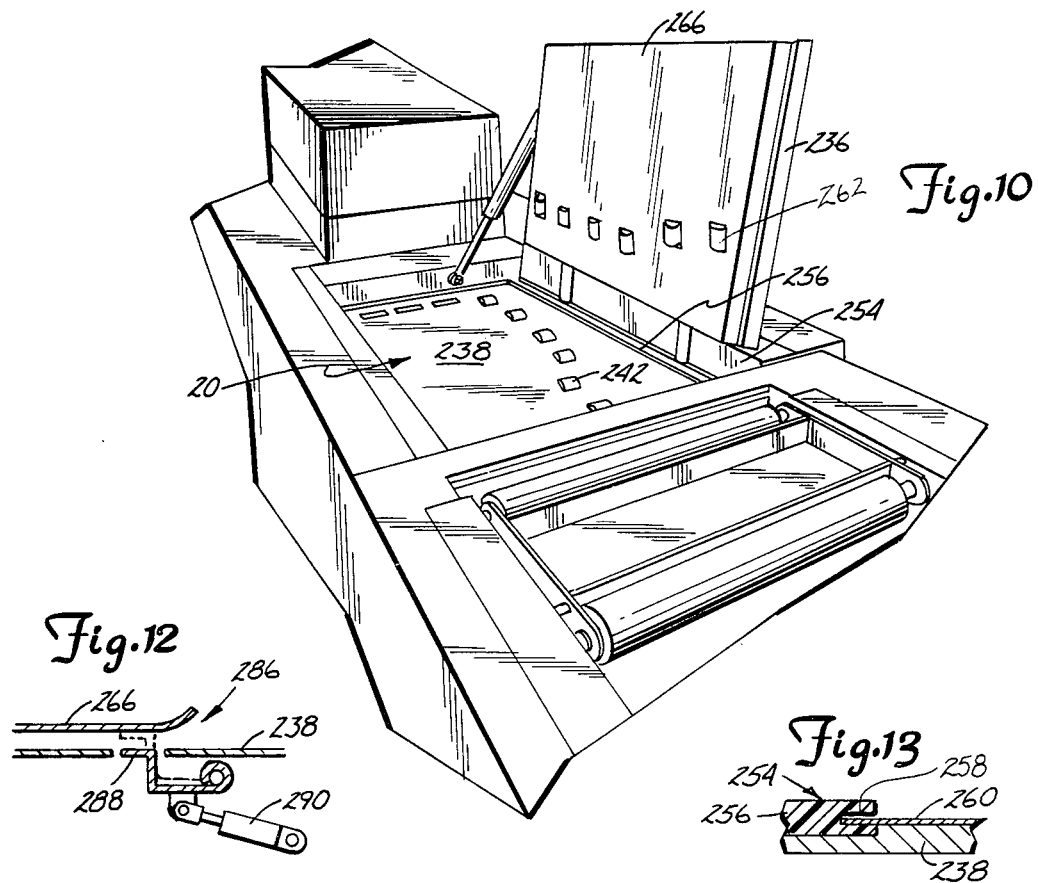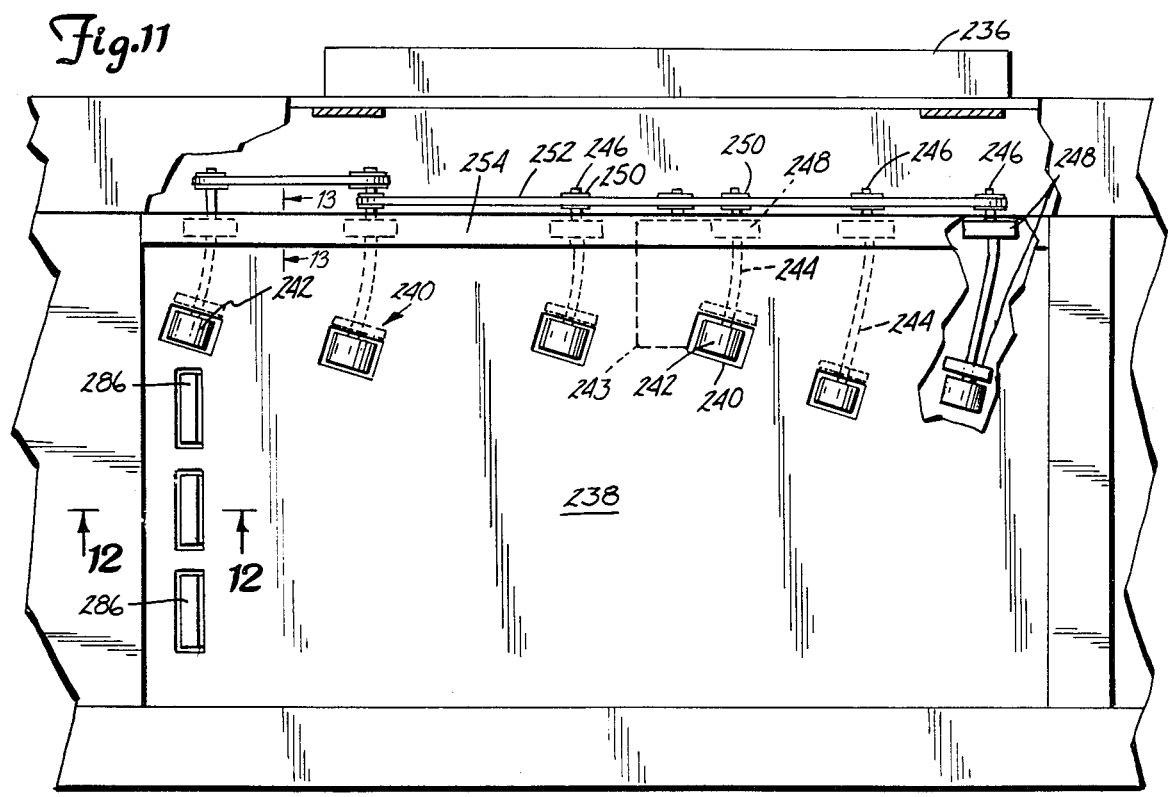

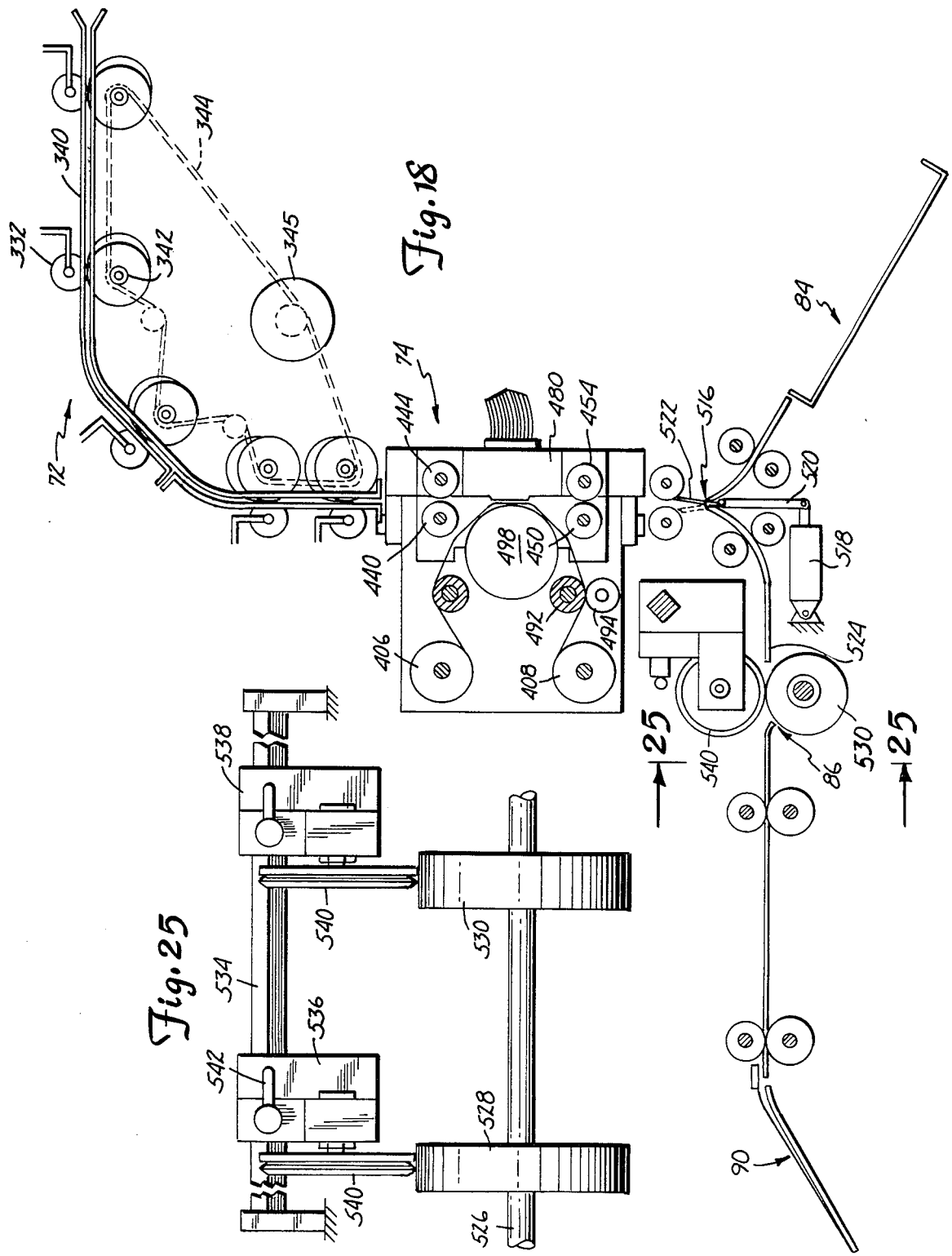

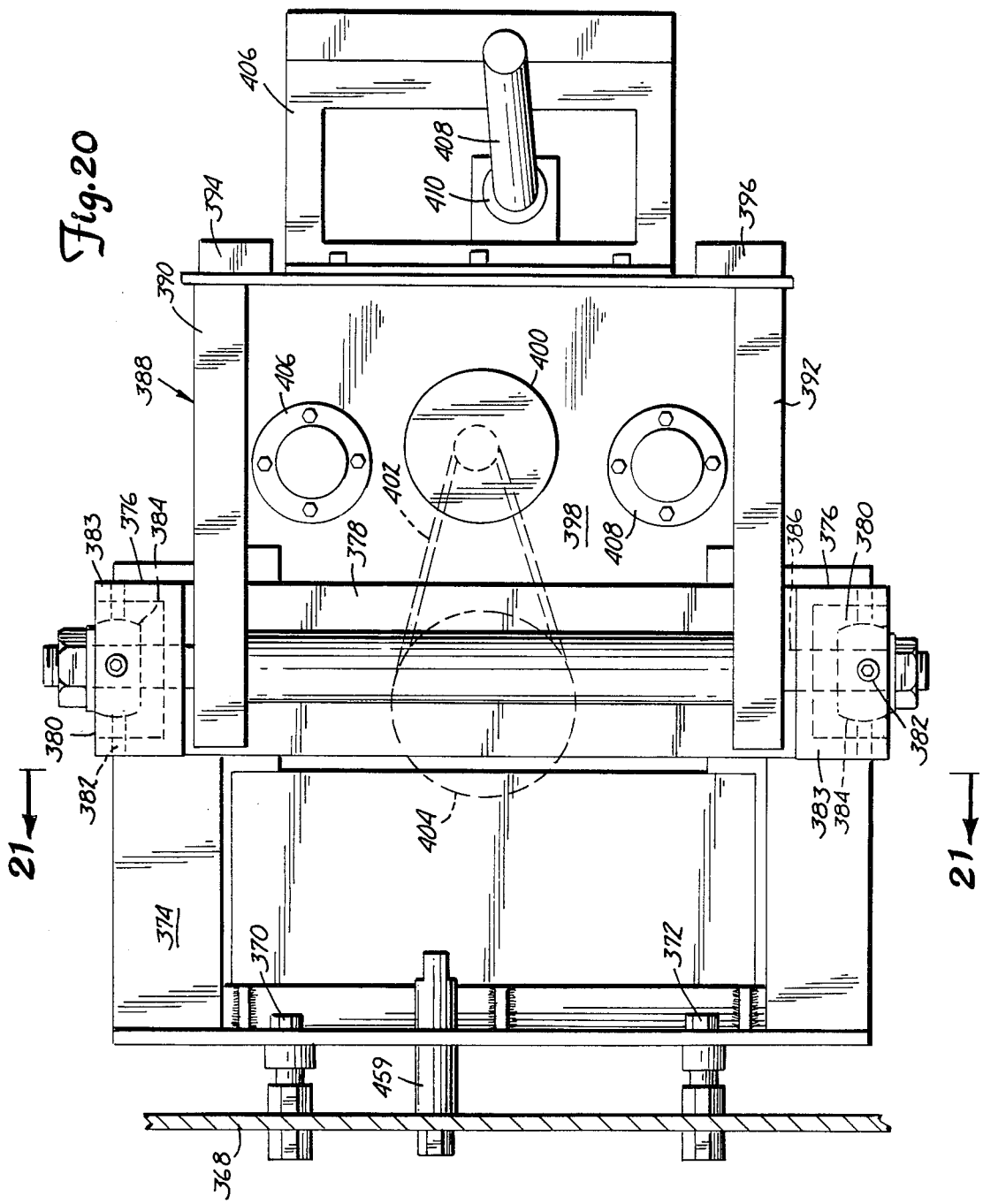

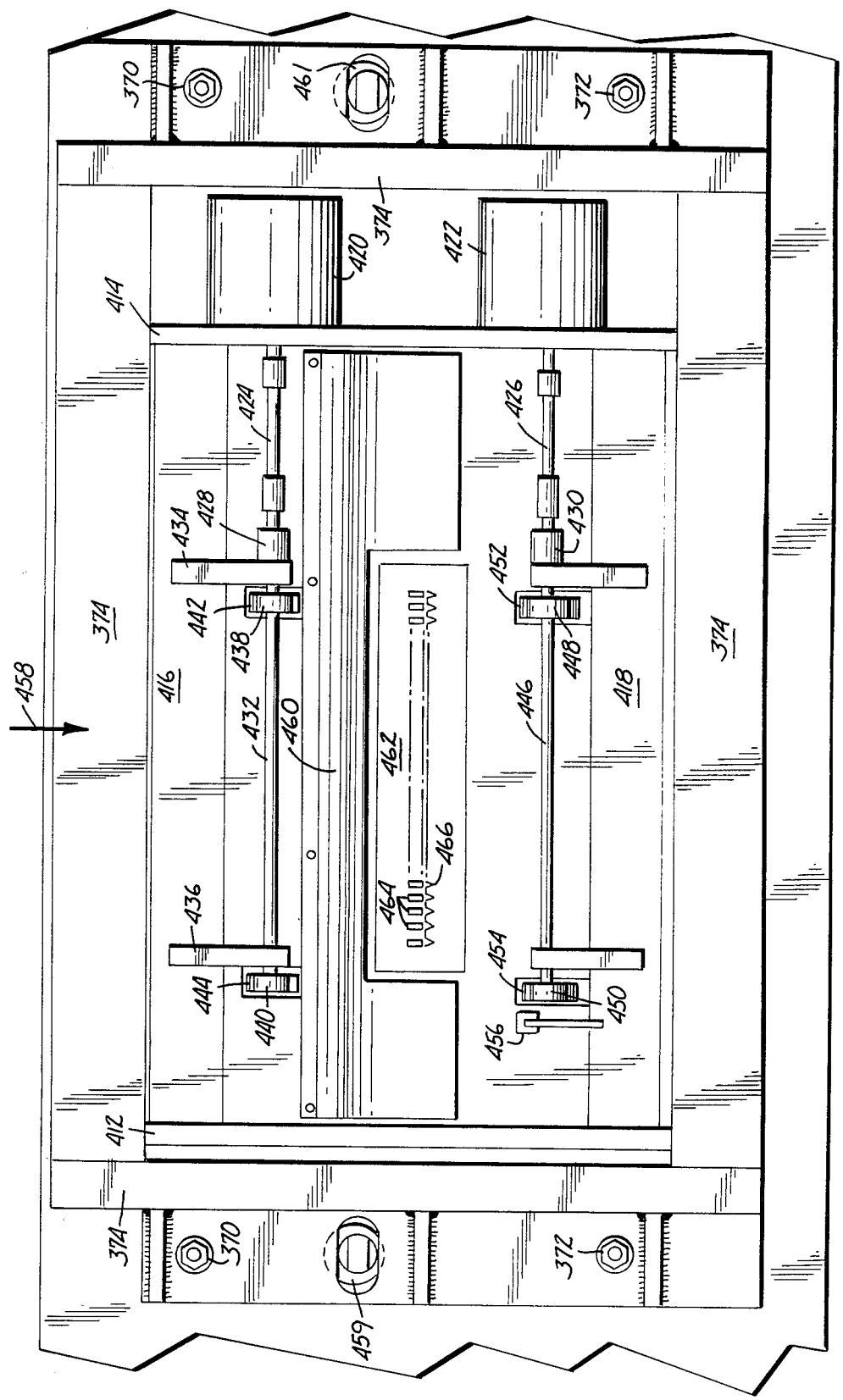

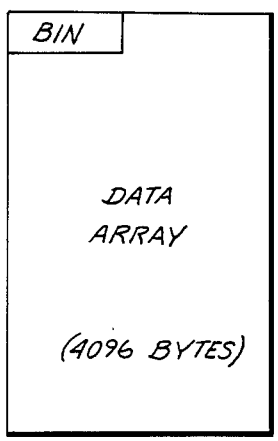
Fig. 28A
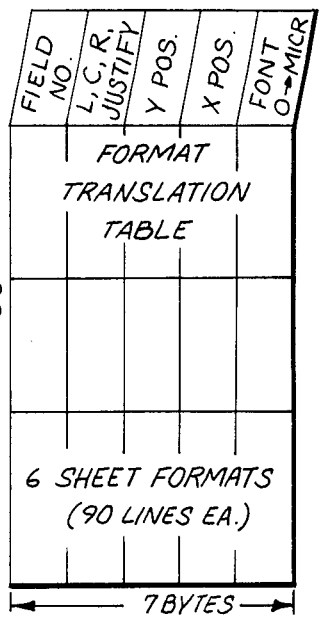
Fig. 28B
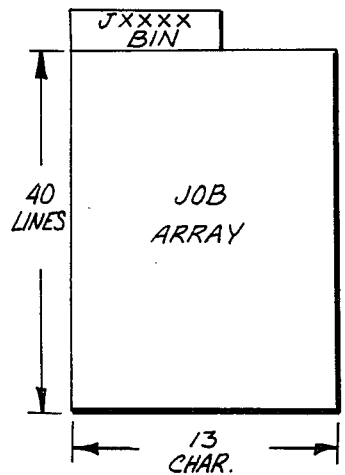
Fig. 28C
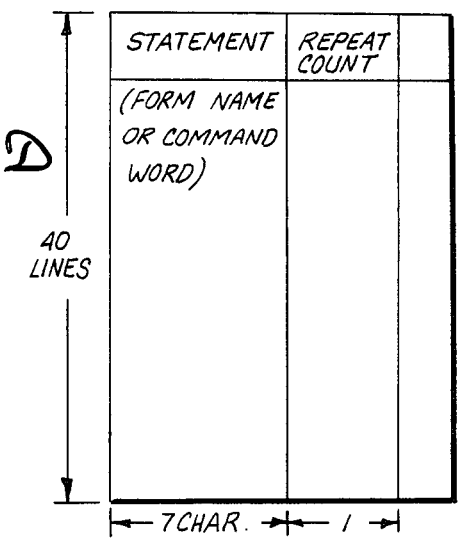
Fig. 28D
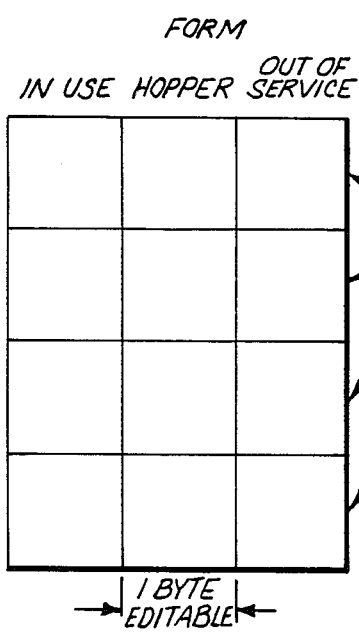
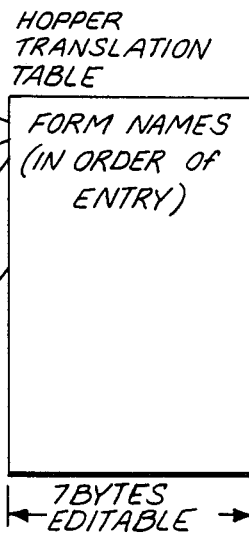
Fig. 28E

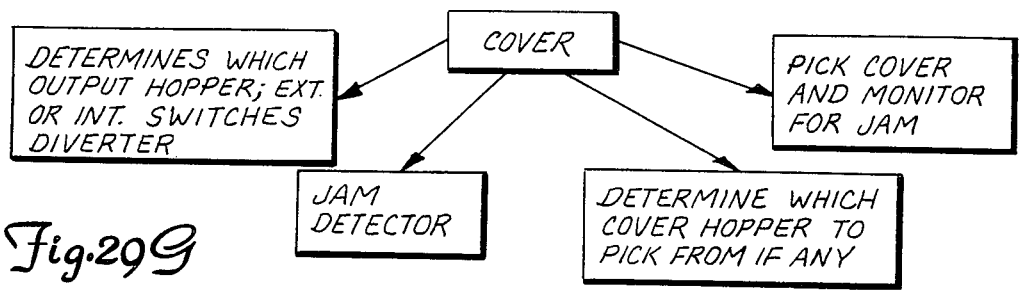
Fig. 29G
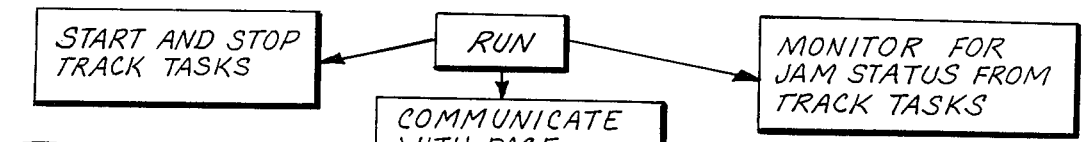
Fig. 29H
TRACK TASKS; FMPICK
INPT
SNUB
PREMCR
MICRCM
COVER
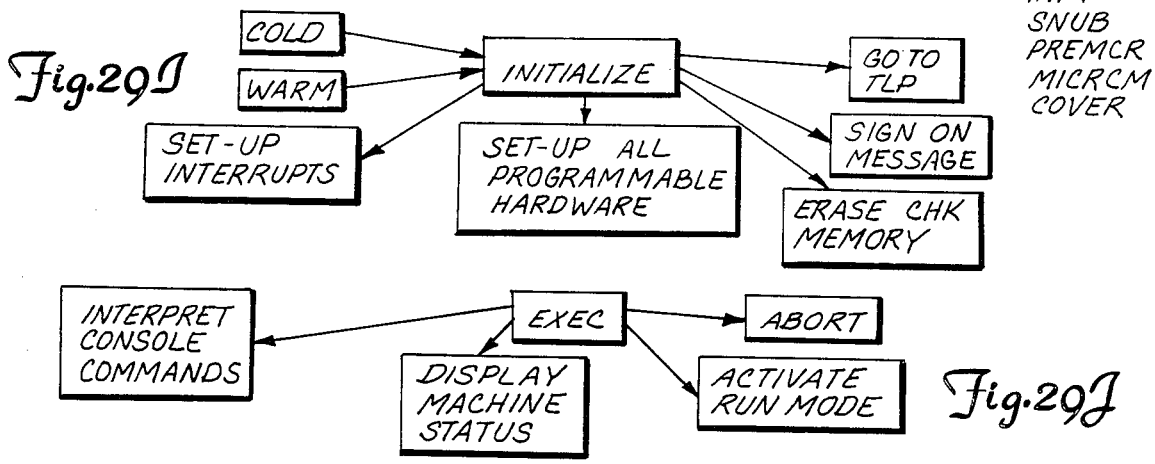
Fig. 29I
Fig. 29J
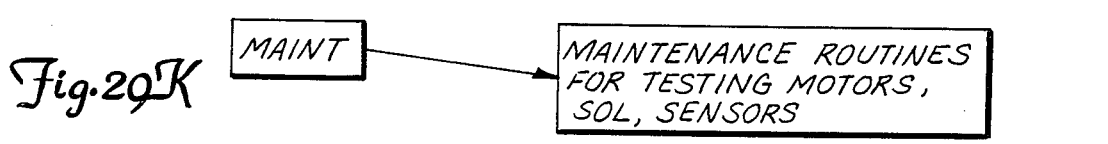
Fig. 29K
Fig. 29L
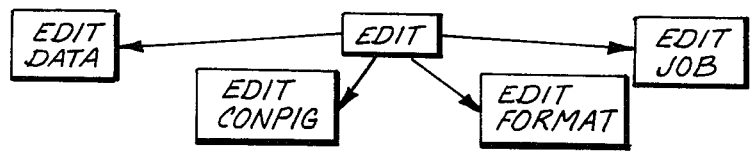
Fig. 29M
Fig. 29N
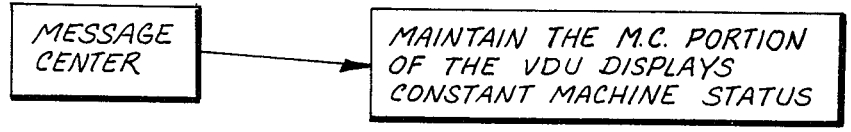

DOCUMENT PRINTING METHOD AND APPARATUS

BACKGROUND OF THE INVENTION

I. Field of the Invention

This invention relates generally to printing apparatus and more specifically to a system for printing business documents with both alpha/numeric characters and with standard MICR symbols. II. Discussion of the Prior Art In the past, business documents such as blank checks and related deposit tickets have been chiefly produced through the use of offset printing presses. Such techniques have involved manual labor and multiple-step functions to generate high-quality printed documents. Improvements in typewriters, typesetting equipment, word processors and hard-copy impact printers designed for the data processing industry have addressed many of the economic obstacles which are inherent in the prior art, labor-intensive printing systems. More recently, the introduction of high-quality dry-copier xerographic printers for low-volume duplication tasks have provided an alternative to the printing press and other conventional printing processes. Such technological enhancements in electronic typesetting, together with advanced dry-copier image-transfer techniques, have permitted the automation of the set-up, paper-handling and collating functions of the printing process. Nevertheless, computer-controlled printers have not been able to duplicate the quality, proportional spacing and style flexibility available through the use of offset printing.

Because of the demand for high alpha/numeric print quality, almost all of the personal checks sold in the United States are currently produced by independent check printing companies utilizing traditional printing press equipment. Because of the significant capital outlays for such equipment and the incompatibility of a mechanical printing press to an office environment, banks and similar institutions have not attempted to produce checks for their customers on an in-house basis. Because of the inability of computer high-speed printers to provide required print quality, domestic manufacturers of such printers have concentrated on selling their equipment to companies which produce their own business checks or to foreign customers where high alpha/numeric print quality is not demanded.

The system of the present invention provides a cost-effective printing system having the flexibility and efficiency inherent in computer printers but with significantly improved alpha/numeric print style and quality and integrating several check printing functions, including the ability to print MICR symbols so precisely and accurately that the coding can later be read using MICR compatible sensors.

SUMMARY OF THE INVENTION

The printing system of the present invention comprises four basic modules, each performing a separate and distinct function. Coordinated control over each of the modules is provided by a microprocessor-based control system including a master microprocessor and four slave microprocessors along with the requisite storage capacity for containing the operating system software and the application software. The master microprocessor is a 16-bit device which functions to control the system's operation as instructed by the user or operator. The operator may enter instructions to the master microprocessor through a terminal device including a keyboard entry unit and CRT display. Alternatively, the operator may insert a preprepared magnetic computer tape into the system.

The system of the present invention includes a paper input module consisting of a plurality of paper hoppers, the number of which is optional and determined by the printing needs of the user. Each hopper may contain a supply of paper, with the paper in each hopper differing in some characteristic such as size, color, pictorial background and preprinted information. The microprocessor commands the appropriate input hoppers to deliver the desired number of sheets in the sequence desired through a track which precisely aligns the various sheets to enter the alpha/numeric printer module.

In implementing the system of the present invention, the alpha/numeric printer module employs a non-impact printing device in which the microprocessor system reads the print data off of the computer tape and transmits it to another microprocessor termed the "format controller." Here, the data is converted to alpha/numeric character forms comprising a matrix arrangement of dots. The dot patterns are impressed on to a rotating dielectric cylinder in the form of charged ions. The rotating cylinder is brought into contact with a brush filled with print toner powder which causes the toner to be attracted to the charged ions. The resulting image is transferred to the paper by pressing the cylinder against the paper and transferring the toner to the paper under high pressure. Because of the extreme pressures employed, thermal fusing of the toner to the paper is not required.

The paper exiting the alpha/numeric printer is again properly aligned and conveyed to the system's third module, the MICR printer module. This device is an impact-type printer and, accordingly, the paper must be stepped and indexed. Here again, the stepper motors and hammers associated with the drum-type MICR printer are controlled by a microprocessor, yielding precise placement of each MICR line and character so as to conform with existing standards.

The fourth module of the system is the output hopper where the paper leaving the MICR printer is accumulated. It is contemplated, however, that the system of the present invention may be coupled to a finishing module which may function to collect, stitch and tape the printer paper into book form.

The printing system of the present invention offers the advantages of ease of use, efficiency and the ability to collate; to print different documents at a consistent speed regardless of the amount of print; to vary the number and order of such documents within one machine run; to produce both MICR and high-quality alpha/numeric print; to provide proportional spacing; and, to print logos and signatures.

DESCRIPTION OF THE DRAWINGS

The foregoing features and advantages of the invention will be better understood by referring to the drawings in which like numerals in the several views refer to corresponding parts.

FIG. 1 is a perspective view of a preferred embodiment of the document printing system of the present invention;

FIG. 2 illustrates an example of a typical instrument produced by the system of the present invention;

FIG. 3 is a system block diagram of the preferred embodiment of FIG. 1 showing the major functional modules and their relationship to one another;

FIG. 4 is a mechanical flow diagram indicating schematically the various modules comprising the present invention;

FIG. 6 is a sectional view taken along the line 6—6 of FIG. 5;

FIG. 7 is an enlarged sectional view taken along the line 7—7 of FIG. 6;

FIG. 10 is a partial perspective view of the portion of the embodiment of FIG. 1 for transporting and positioning paper for acceptance by the page printer;

FIG. 11 is an enlarged plan view of the paper positioner of FIG. 10 with its cover in the open position;

FIG. 12 is an enlarged sectional view of a paper gate taken along the line 12—12 in FIG. 11;

FIG. 13 is an enlarged cross-sectional view of the "reference edge" taken along the line 13—13 in FIG. 11;

FIG. 18 is a side diagrammatic view of the MICR printer paper pre-positioner, MICR printer, perforated assembly and output hopper;

FIG. 20 is a side view of the hinge side of the MICR printer;

FIG. 21 is a sectional view taken along the line 21—21 of FIG. 20;

FIG. 23 is a partial perspective view of the MICR printer in its non-printing, out position;

FIG. 25 is an enlarged sectional view taken along the line 25—25 of FIG. 18;

FIGS. 28A through 28E diagrammatically illustrate the configuration of the "DATA", "FORMAT", "CONFIGURE" and "JOB" arrays stored in memory.

DESCRIPTION OF THE PREFERRED EMBODIMENT

Figure 5:
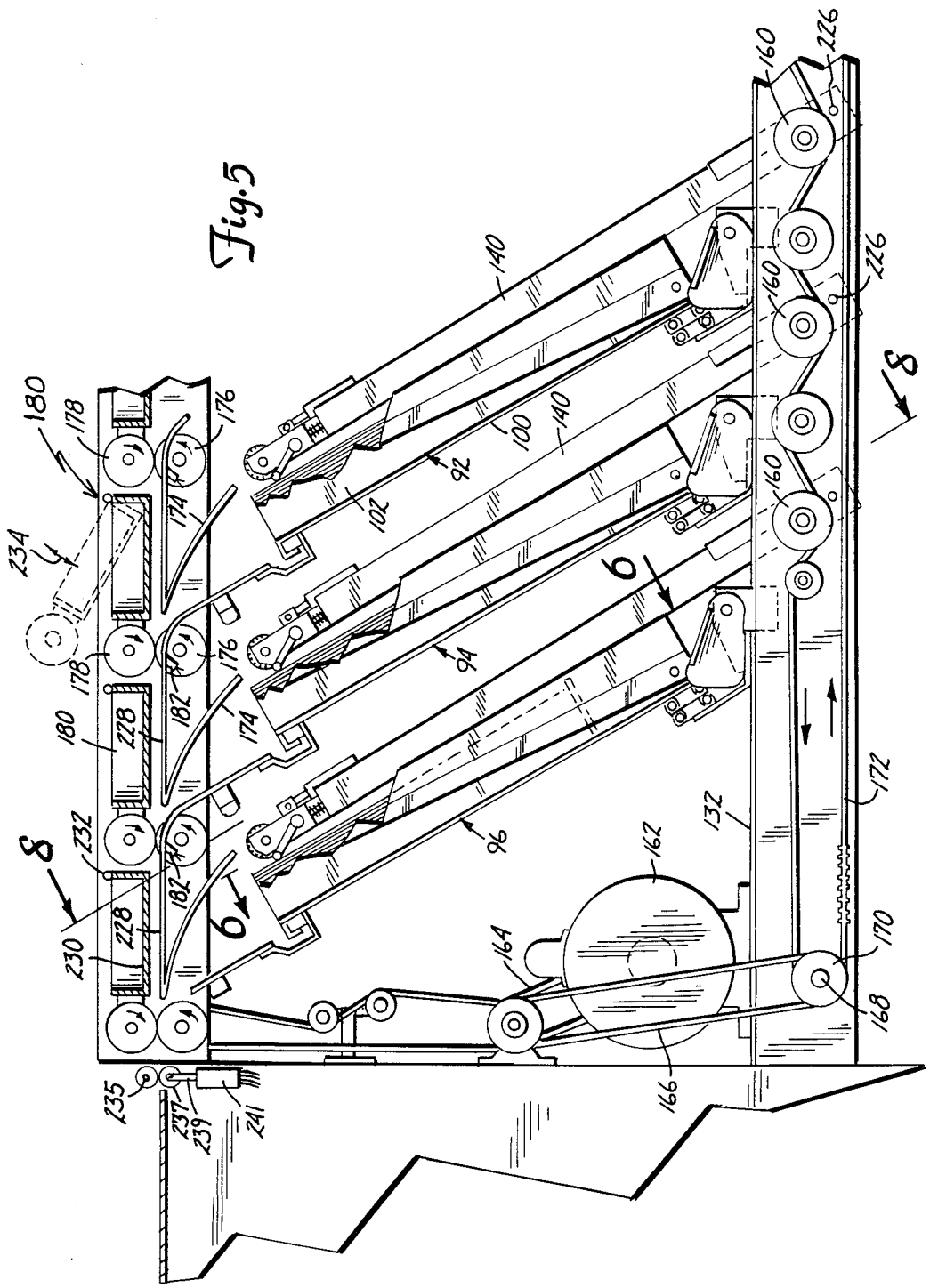
FIG. 5 is an enlarged sectional view taken along the line 5—5 in FIG. 1.

Certain terminology will be used in the following description for convenience in reference only and should not be considered as limiting. The words "upwardly," "downwardly," "rightwardly," and "leftwardly" will refer to directions in the drawings to which reference is made. The words "inwardly" and "outwardly" will refer to directions toward and away from, respectively, the geometric center of the device and associated parts thereof. This terminology will include the words specifically mentioned above, derivatives thereof and words of similar import.

The automated document printing system of the present invention is indicated generally by numeral 10 in FIG. 1 and is seen to include a plurality of modules and compartments mounted on a structural frame. These modules and compartments will now be briefly described in order to orient the reader as to the overall system makeup and, following that, a detailed description will be given as to the constructional details and mode of operation of each of the several modules.

At the rightmost end of the automated document print system 10 is an Input Hopper module 12 containing a plurality of slidable trays as at 14, 16 and 18. Each tray may typically hold up to 500 sheets of 24 lb. paper. The input Hopper module 10 typically contains four such trays but is expandable to include up to sixteen trays, in groups of four. The individual hopper trays 14, 16, 18, etc. may contain stacks of paper having differing characteristics, such as size, background printing, color, etc. Each of the hopper trays is independently addressable and, under computer control, paper can be removed, a sheet at a time, from them in a preprogrammed order.

The module identified generally by numeral 20 houses a transport/pre-positioner assembly which functions to receive the programmably-selected sheets from the Input Hopper unit 12, one-at-a-time, and to move those sheets into an abutting relationship with a "reference edge", while simultaneously being advanced to the left toward an alpha/numeric page printer module, the location of which is indicated by numeral 22, it being housed beneath a hinged cover 24.

The alpha/numeric page printer is preferably a non-impact printer and may employ ion-imaging technology whereby printed characters are comprised of a plurality of dots arranged in accordance with a given format, the dots being imaged on the surface of a rotating dielectric drum. As the dot patterns sweep by a toner brush, a contrast medium (toner) is attracted to and adheres to the drum at the dot locations. The drum is made to move past the sheet of paper to be printed and sufficient pressure is applied between the paper and the rotating drum so as to transfer and cold-fuse the toner to the paper. An exemplary non-impact ion-imaging printer highly suited for use in the system of the present invention is the Delphax Model 2460 Image Output Module manufactured by Delphax Systems of Ontario, Canada. However, since other page printers are available, limitation to the Delphax Model 2460 is not intended.

The position of the printing on the paper as well as the data to be impressed thereon is stored on magnetic tape, there being a magnetic tape transport contained behind a cover 26. An operator's control panel for the tape unit is identified by numeral 28.

As will be explained in considerably more detail hereinbelow, the pre-programmed computer tape provides input commands and data to a microprocessor controlled board set consisting of a slave CPU, a Format/Controller and a logo store. This electronic module converts the magnetically encoded signals from the tape into alpha/numeric position data locating the dots at predetermined locations within a matrix. The electronic modules are contained in "cages" within the housing with access thereto being available through the hinged doors 30.

Following exit from the alpha/numeric drum printer, the paper is carried via a post-positioner which is not visible in FIG. 1 but which is also located below the hinged cover 24. Following that is a further conveyor mechanism, termed the "MICR pre-positioner" contained within the housing beneath the hinged cover 32. The pre-positioner module creates a transition from a horizontal path of travel to a generally vertical path of travel while simultaneously registering the sheet's edge with a reference edge. Disposed beneath the outlet of the MICR pre-positioner module is the MICR printer itself, which is also frequently referred to herein as the "MICR encoder". This device is physically located within the housing and accessible through the hinged door panel 34.

In the preferred embodiment of the present invention, the MICR encoder comprises a 40-column drum-type impact printer. The drum, for example, may contain two sets of fourteen E13B characters in accordance with standards established by the American Banking Association which are placed in a checkerboard pattern in accordance with known printer techniques. The drum is continuously driven and, as the paper incrementally advances in synchronism with a magnetic ink carbon ribbon close to the drum, hammers are actuated at the precise instant to impress selected characters onto the paper. In that a 40-column drum is used, it is possible to create 40 contiguous MICR characters at any one time. As will be explained in greater detail, the mechanical construction of the MICR pre-positioner module and the printer itself provides the required degree of precision in the placement of the printed MICR line, which is mandatory if the document is later to be read using standard MICR reading equipment.

Once the paper leaves the MICR printer, it may be presented to a perforator followed by deposit in a first Output Hopper or, alternatively, may be deposited in an alternate Output Hopper. The perforator and Output Hopper are disposed within the portion of the cabinet identified by numeral 36.

The operator may enter instructions to the microprocessor through an operator-control station which preferably comprises a video display terminal 38 having a CRT screen 40 and a keyboard entry panel 42.

By way of further background, there is illustrated in FIG. 2 a typical type of business document which may be printed using the system of the present invention. As was mentioned in the introductory portion of the Specification, the printing system of the present invention is highly suited for the preparation of business forms such as checks, bank drafts, bank deposits and withdrawal forms, which documents are usually assembled and bound into a so-called "checkbook". That is to say, there are bound together a predetermined number of check blanks, each being serially numbered, a somewhat lesser number of deposit tickets, a cardboard cover and backing and quite commonly one or more pages including instructions, advertising or other information.

With reference to FIG. 2, a typical check blank which may be prepared using the printing apparatus of the present invention is seen to comprise a sheet of paper indicated generally by numeral 44 having a front face containing printed matter and spaces to accommodate additional written matter to be added by the end user. Typically, a check like that illustrated in FIG. 2 includes a check number as at 46 which is unique to any given check document and serially numbered in a book of such checks. Other alpha/numeric information are also included. There is the personalized name and address of the maker or account holder as at 48, a bank Federal Reserve ID number 50, the name and address of the drawee bank and any trademark or corporate logo that the bank may use as at 52 and the other pre-printed words, blanks (lines) and symbols illustrated. In addition to the alpha/numeric information already mentioned, information which is readable by magnetic ink character recognition (MICR) equipment is also encoded on the check, the numbers and symbols being identified by the lowermost line of numerals and symbols 54. Thus, the system of the present invention is capable of printing the serial check number 46, the account holder information 48, the Federal Reserve routing number 50, the bank name, address and logo 52 and the MICR number 54. Any other information desired on the face of the document would have been pre-printed by a conventional printing process. For example, blank lines 55, filagree boarders, scenic backgrounds (not shown) or any other non-alpha/numeric characteristics are preferably pre-printed on the paper stock loaded into the Input Hopper 12.

Referring to the block flow diagram of FIG. 3 and to the schematic mechanical diagram of FIG. 4, a further general description of the overall system is presented. The system includes the Input Hopper assembly 12 for storing a plurality of trays or bins of stock paper. Each of the bins may contain paper of the same characteristics, but in a usual situation, the individual bins comprising the Input Hopper 12 will contain stacks of paper having different characteristics. As illustrated in FIGS. 3 and 4, under programmed control from the control logic 56, signals will be sent to solenoid actuators of the individual pick arms, 58, 60, 62 associated with the bins in the Input Hopper so as to cause individual sheets from the various stacks to be selected in a desired order and fed in a serial fashion via the upper conveyor of the Input Hopper module and the alpha/numeric printer pre-positioner 64 to the alpha/numeric page printer 22.

The alpha/numeric printer pre-positioner 64 (FIG. 4) comprises a plurality of pinch roller pairs where lower rollers 73 are driven in unison by a motor and a belt and pulley arrangement and are skewed with respect to the longitudinal axis of the system and the upper idler member 75 of the pair is castor mounted for urging paper flowing therebetween against a reference edge (not shown), thus aligning the paper for entry into the page printer 66. Details of the alpha/numeric pre-positioner 64 will be set forth in greater detail below.

The alpha/numeric page printer 66 is a non-impact printer using an advanced xerographic process. A master microprocessor forming a part of the control logic 56 takes print data off of the computer tape 68 (FIG. 3) and transmits that data to a further microprocessor termed the "Format/Controller". This latter microprocessor converts the data signals to alpha/numeric character forms through the use of a dot-matrix array. Accurately focused charged ion beams are employed to "paint" the dots on to a rotating cylinder within the alpha/numeric page printer 66 and a magnetic toner brush is used to deposit print toner on to the rotating cylinder where the powder adheres to the ion-charged areas. The character image thus formed is transferred to paper by bringing the rotating cylinder into pressure contact with the paper and, following that, any surplus toner remaining on the drum is removed prior to receiving a new charged pattern from the ion source.

The printed paper, upon leaving the page printer 66, is conveyed via a paper transport device 70 to the infeed end of a unit termed the MICR pre-positioner 72. As is indicated in FIG. 4, the combination of the paper transport 70 and the MICR pre-positioner 72 is to convert the paper flow from a horizontal travel path to a vertical travel path as it enters the MICR printer station indicated generally by numeral 74.

The MICR printer 74 is a somewhat standard impact-type drum printer which utilizes a special magnetic ink ribbon 76 and a hammer assembly 78 to strike the paper and ribbon against appropriately selected character fonts formed on the surface of a rotating drum 80. Being an impact-type printer, the paper and the ribbon must be stationary at the instant of hammer impact. The drum, however, may be moving. Incremental motion of the ribbon and the paper transporting rollers is controlled by pulses emanating from the microprocessor electronics, all as will be further explained in much greater detail hereinbelow. Furthermore, in that the resulting document must be capable of being read by MICR reading equipment, it is essential that the MICR characters printed on the paper be placed with high precision and in accordance with existing standards. Again, this precision placement is controlled through the mechanical design of the printer module and through the use of the microprocessor and associated logic comprising the control logic 56 which supplies control pulses to the stepper motors used for advancing the paper and the magnetic ribbon 76.

As the printed paper leaves the MICR printer station 74, it is presented to a solenoid-controlled diverter gate 82 which, when operated in a first fashion, causes the resulting printed forms to be deposited first-in, face-down in an Output Hopper station 84. Alternatively, the diverter gate 82 may cause the printed forms to be transported past a perforator wheel 86 and past one or more Cover Insertion hoppers 88 whereby cardboard covers may be inserted into the stream of printed paper forms exiting the MICR printer station 80 before they are deposited in the Output Hopper 90.

Now that the overall system components have been generally described, attention will next be given to details of construction of the more non-conventional mechanical devices comprising the system and, following that, a detailed explanation will be presented of the electronic control which coordinates the overall system operation. By following this approach, it is expected that persons skilled in the art will be in a position to make and use the invention thereafter claimed.

INPUT HOPPER MODULE (FIGS. 5-9)

As already described, the Input Hopper is the mechanism used to store sets of paper forms and which, under computer control, deposits selected forms into the serial stream leading to the alpha/numeric page printer. Referring first to FIG. 5, there is shown a side elevation view of a segment of the Input Hopper module 12 showing a plurality of tray assemblies as at 92, 94 and 96. Each of these tray assemblies may be loaded with a supply or stack of unbound sheets of paper of a predetermined thickness and these sheets may be pre-printed with graphic information, all as has already been explained. Each tray comprises a base plate 100 and parallel and spaced-apart side walls 102 and 104 (FIG. 6). The base plate is slotted as at 106 to permit lateral adjustment of the side walls 102 and 104 of the trays so as to accommodate paper of varying widths. Specifically, threaded pins 108 secured to the side walls pass through the slots 106 and wing nuts 110 (FIG. 7) are threaded on to the posts whereby they can be loosened and tightened upon lateral positioning of the adjustable side wall members 102 and 104. Pivotally joined to the side walls 102 and 104 proximate the lower end thereof are the respective arms 112 and 114 of a buckle fold pick assembly. The arms 112 and 114 can rotate about the pivot posts 116 and a slotted wheel 118 journaled on each of the arms 112 and 114 is positioned so as to cooperate with the vertical front edge of the tray side walls 102 and 104 as indicated to maintain the arms parallel while allowing motion in a direction normal to the paper stack. A coil spring 120 (FIG. 7) surrounds the post 116 and is arranged to normally urge the buckle fold pick arm toward the base 100 of the paper tray, the direction being indicated by the arrow 122 in FIG. 7.

Integrally formed at the opposite end of the buckle fold pick arms 112 and 114 from the pivot post 116 are transversely extending fingers 124 and 126. These fingers have a downwardly projecting flange which extends slightly into the path of travel of the paper as it is ejected from the tray in a fashion yet to be described. The degree of interference of this downwardly-depending lip on the fingers 124 and 126 with the opposed upper corners of the paper stack is adjustable by means of the threaded positioners 128.

With reference to FIG. 7, it can be seen that the bases 100 of the paper trays are mounted on drawer slides 130 and that one segment of the drawer slide is secured to the frame 132 by means of an angle bracket 134 such that the tray is made to reside at a predetermined angle with respect to the vertical. Similarly, the upper edge of the tray 100 is made to cooperate with a transversely extending nylon slide bar 136 which is also secured to the frame (not shown) by means of a suitable bracket 138. Using this arrangement, it is possible to laterally pull a tray assembly 14, 16 or 18 (FIG. 1) out from the frame of the Input Hopper module 12.

Figure 8:
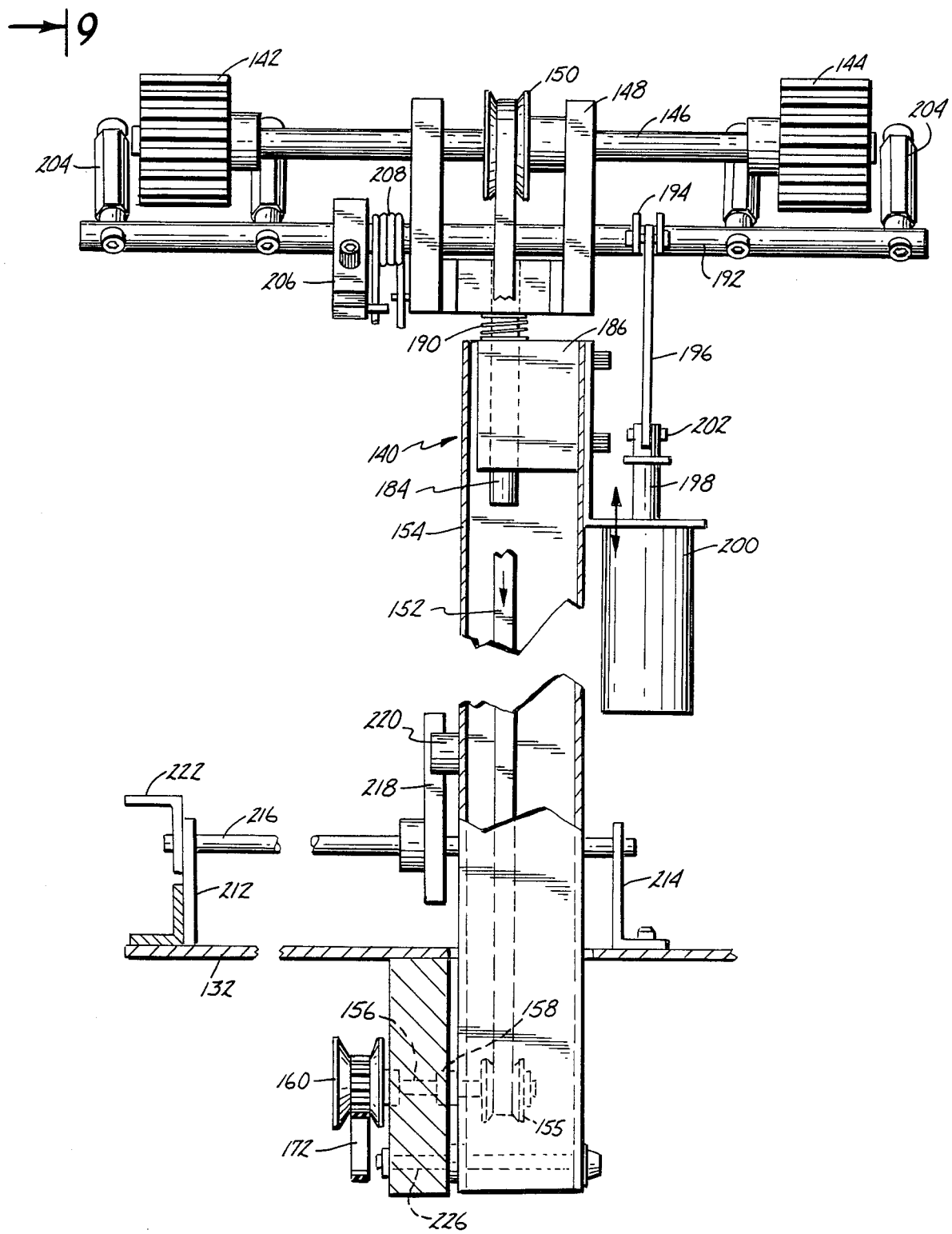
FIG. 8 is an enlarged front view, partially sectioned, taken along the line 8—8 of FIG. 5 and illustrating a typical pick arm assembly.
Figure 9:
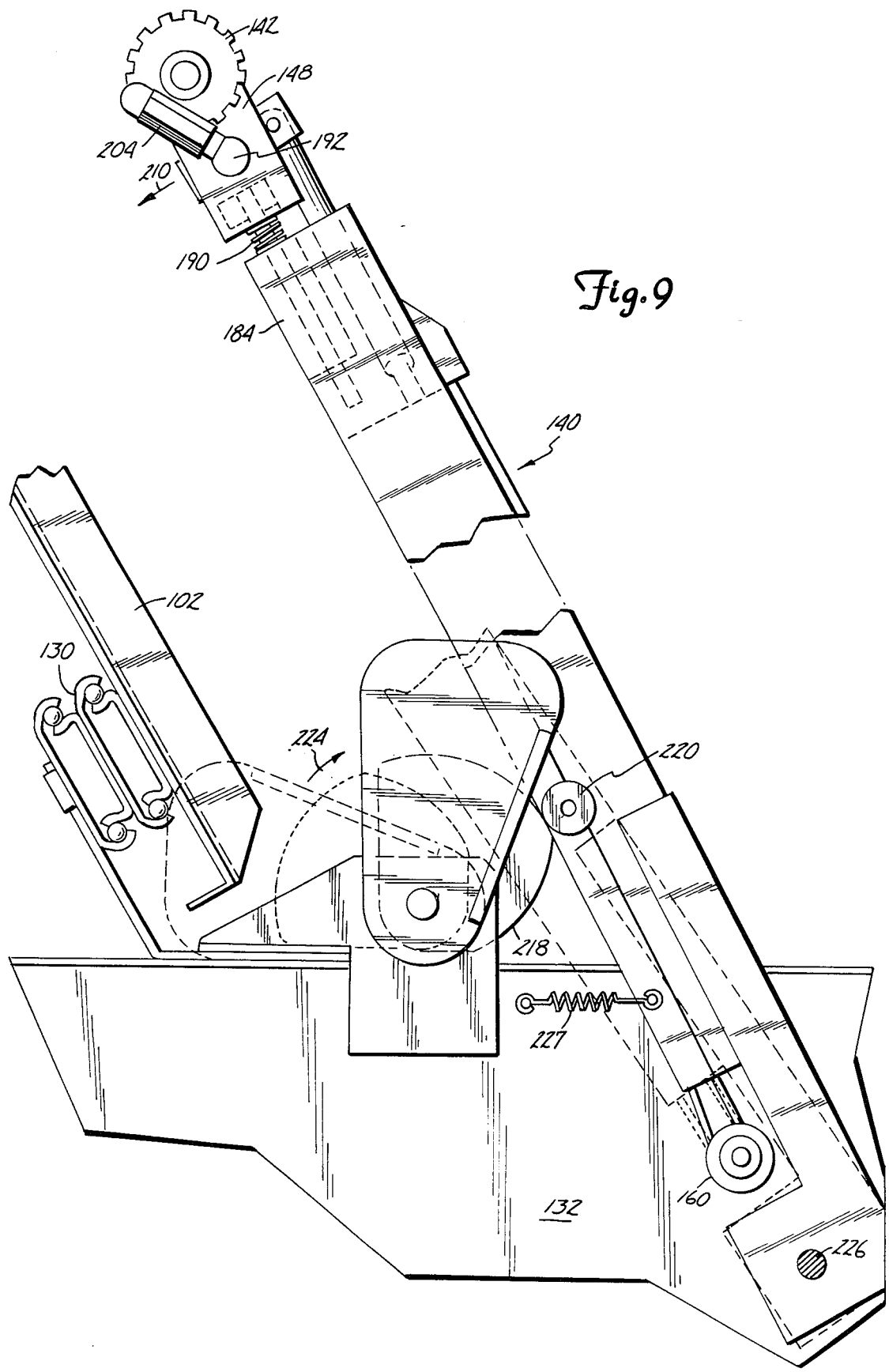
FIG. 9 is a partial side view of the pick arm assembly taken along the line 9—9 of FIG. 8.

Associate with each of the form bins or trays 92, 94 and 96 (FIG. 5) is a pick arm assembly 140 which is more clearly set out in FIGS. 8 and 9. With reference to these figures it is seen to comprise first and second spaced-apart friction rollers 142 and 144 which are mounted on a rotatable shaft 146 journaled in a yoke assembly 148. Affixed to the shaft 146 is a pulley 150 which is surrounded by an endless belt 152 passing through a channeled arm 154 and surrounding a further pulley 155 which is secured to a stub shaft 156 which is also journaled for rotation in suitable bearings 158. Attached to the end of the jack shaft 156 is a further pulley 160.

With reference to FIG. 5, an electric motor 162 mounted on the frame 132 is coupled by endless belts 164 and 166 to a rotatable shaft 168 having a double pulley 170 secured thereto. An endless belt 172 runs horizontally along the frame member 132 and engages the pulleys 160 associated with each of the pick arm assemblies 140. It can be seen, then, when the motor 162 is energized, rotational forces will be applied via the belts 164, 166 and 172 to drive the pulleys 160. This, in turn, continuously drives the rollers 142 and 144 by way of the belt and pulley combination 150, 152 and 155. The pick arm assembly 140 is poised over the stack of sheets contained in the paper trays 92, 94, 96, etc., and so long as the rollers 142 and 144 remain out of contact with the exposed top sheet of paper in the stack, the sheet will remain in its bin. However, upon appropriate command from the microprocessor, means are provided for causing the rotating rollers 142 and 144 to contact the paper contained in the selected bin. The direction of rotation of the rollers is such that the sheet of paper in contact with the rollers will be moved up and out from the top of the stack. As the leading edge of the sheet engages the fingers 124 and 126 on the buckle fold pick arms 112 and 114, the limited interference presented by these fingers will cause the top sheet to buckle and separate itself from the next underlying sheet. As this separated sheet is lifted as viewed in FIG. 5, it will engage a sheet metal deflector as at 174 and be directed to the intersection between an upper conveyor drive roller 176 and an upper conveyor idle or pinch roller 178.

With continued reference to FIG. 5, it can be seen that each of the upper conveyor drive rollers 176 is belt-driven, in unison, by the same motor 162 used to drive the pick arm rollers 142 and 144. It can be seen, then, that as a sheet is picked out from a microprocessor selected hopper bin and diverted into the upper conveyor 180, it will be fed leftward by virtue of the upper conveyor drive rollers 176 engaging the paper as it traverses the conveyor.

Disposed adjacent to each of the upper conveyor pinch roller pairs 176 and 178 is a paper sensor 182. These sensors detect the presence of paper at the site of the sensor and provides signals back to the microprocessor whereby the progress of paper along the upper conveyor 180 can be monitored. As will be more fully explained when the details of the electronics comprising the present invention are discussed, a sheet of paper of a given size must pass completely across the sensors 182 within certain predetermined time constraints and, if this does not result, a jam condition is indicated.

Referring again to FIG. 8, the device for actuating the pick arm head so as to selectively raise and lower the rollers 142 and 144 relative to the paper stack will now be explained.

The yoke assembly 148 sits atop the pick arm member 140 and a pin 184 projects downward from the base of the yoke into nylon mounting block 186 disposed in the upper end of the arm 154. The pin 184 is free to rotate within the block, allowing the pick arm rollers 142 and 144 to conform the irregularities in the surface of the paper stack. A compression spring 190 which is made to surround the pin 184 tends to exert a separating force on the yoke 148. This spring thus applies a constant tension on the belt 152. A horizontally extending rod 192 passes through bushings in the parallel leg portions of the yoke 148. A clevis connection 194 is affixed to rod 192 and pivotally secured to the clevis connection is an actuator arm 196 which is joined to the plunger arm 198 of a solenoid 200 by means of a pin connection 202. The solenoid 200 is affixed to the side surface of the tubular pick arm 154.

Projecting outwardly at a predetermined angle from the rod member 192 are a plurality of support fingers as at 204. The fingers are disposed in pairs on either side of the pick arm rollers 142 and 144. A spring stop member 206 is fixedly clamped to the rod 192 and a coil spring 208 is arranged to cooperate with the clamp 206 and a pin projecting outwardly from the side of the yoke 148. The spring is configured to normally urge the rod 192 in a counterclockwise direction when viewed in FIG. 9. This force pushes the fingers 204 against the paper in the hopper tray. Now, when the solenoid 200 is actuated, the plunger 198 moves into the core of the solenoid and, in doing so, imparts a rotational force to the rod 192 in a direction to lift the fingers 204 from the underlying stack of paper. As the fingers lift, the pick arm 154 and head assembly is made to rotate in the direction indicated by the arrow 210 in FIG. 9. This short movement of the fingers 204 is sufficient to bring the surface of the continuously driven paper drive rollers 142 and 144 against the exposed upper sheet of the stack of paper disposed in the paper trays 92, 94, etc. Upon de-energization of the solenoid 200, the coil spring 208 forces the fingers 204 down and the roller assemblies are again lifted from their condition of contact with the paper.

When loading and unloading forms from the input hopper trays, it is desirable to lift the pick arm assemblies 140 out of the way. This is accomplished by means of a cam assembly which is best illustrated in FIGS. 8 and 9 of the drawings. As can be seen in those views, there is secured to the frame 132 a pair of angle brackets 212 and 214 and a shaft 216 is journaled for rotation therethrough. A cam member 218 is also affixed to the shaft 216. This cam cooperates with a cam follower 220 which is attached to the tubular pick arm 154. Crank arm 222 is secured to the end of the shaft 216. The operator may grip the lever or crank arm 222 and rotate same. As he does so, the crank arm 222 is moved so as to unblock the path of travel of the paper tray on its lateral slides 130. Simultaneously it causes the cam 218 to engage the cam follower 220. Because of the cam profile, as the crank is rotated in a clockwise direction as indicated by the arrow 224 in FIG. 9, the pick arm assembly 140 will be also rotated in the clockwise direction so as to move that assembly away from the paper tray. The pivot point for the pick arm assembly 140 is the shaft 226 passing through the frame 132 and through the lower end of the arm 154. To maintain a constant force between the friction rollers 142 and 44 and the paper stack at the time of their engagement, a tension spring 227 is positioned between the pick arm 184 and the frame 132. As the paper supply is depleted and the arm moves counterclockwise, the force on the stack caused by the weight of the arm increases while the spring force from spring 227 deceases.

Before leaving the description of the Input Hopper assembly 12, further explanation of the upper conveyor 180 (FIG. 5) is deemed to be in order. In addition to the sheet metal diverters 174 which serve to route the selected or picked sheets between coacting driven and idler pinch rollers, it also includes a generally horizontally extending plate or platen 228 which is transversely slotted at parallel, spaced-apart locations so as to receive a predetermined arc of the upper conveyor driver rollers 176 therethrough. The surrounding surfaces of the plate 228 provides a support for the sheets of paper as they progress through the conveyor.

The upper conveyor idler rollers 178 are journaled for rotation at the end of pivot arms 230, the pivot arms being pivotally mounted to the frame of the machine by pins 232. As such, the weight of the pivot arm and its accompanying idler roller creates the contact force between the idler roller and its underlying driver rollers 176. Being pivotally joined to the frame, however, it may be rotated in a clockwise direction as indicated by the arrow 234, facilitating clearance of a jam condition and routine maintenance of the assembly.

Located proximate the outlet end of the upper conveyor is a sensing device for detecting and signaling the occurrence of a double pick, i.e., two or more sheets adhering to one another as they are ejected from a paper tray. The sensor comprises a pair of rollers 235 and 237 having a predetermined gap therebetween which is greater than the thickness of one sheet of paper, but less than the combined thickness of two sheets. One sheet can pass through the gap without rotating the roller 237, but two sheets will introduce rotation. This rotation tips an arm 239 coupled to roller 237 so as to cause a photosensor 241 to issue an electrical signal indicative of the double pick condition.

ALPHA/NUMERIC PRE-POSITIONER (FIGS. 10–15)

The design features of the alpha/numeric pre-positioner are illustrated in FIGS. 10 thru 15 of the drawings. The function of the pre-positioner 20 is to take the single sheets exiting from the upper conveyor of the input hopper module 12 and to properly orient these sheets as they are transported to the inlet side of the page printer module so that they can properly enter the printer. The perspective view of FIG. 10 illustrates the alpha/numeric pre-positioner 20 with the cover 236 thereof in its raised (opened) position. It is seen to comprise a smooth sheet metal platen 238 having generally rectangular cut-outs 240 formed therethrough which permits a predetermined arc of a cylindrical roller 242 to project therethrough. The rectangular openings 240 (FIG. 11) are skewed relative to the longitudinal axis of the pre-positioner module 20. The rollers 242 are arranged to be driven by a motor indicated by hidden lines 243 mounted beneath platen 238. Each of the rollers 242 is mounted on the end of a flexible rod 244 joined to a stub shaft 246 and journaled for rotation in bearing blocks 248 and 249. Secured to the opposite end of the jack shaft 246 is a pulley 250 which is driven by an endless belt 252 driven by motor 243.

As can be seen in FIG. 10, extending along the right-hand portion of the platen 238 is a raised member 254 defining a reference edge 256. FIG. 13 is an enlarged cross-sectional view of this reference edge and it is seen to comprise a hardened metal strip 256 mounted atop the sheet metal platen 238 and having an inwardly extending longitudinal groove 258 for receiving the edge of a paper document as at 260. Typically, the groove may be 0.060 inches in height and may have a depth of about 0.25 of an inch.

It is the function of the printer pre-positioner module 20, then, to accept the sheets serially emanating from the upper conveyor input hopper module and to transport the sheet toward the alpha/numeric printer and, while doing so, insure that a longitudinal edge of the paper sheet 260 will abut the reference edge along the paper's length.

Figure 14:
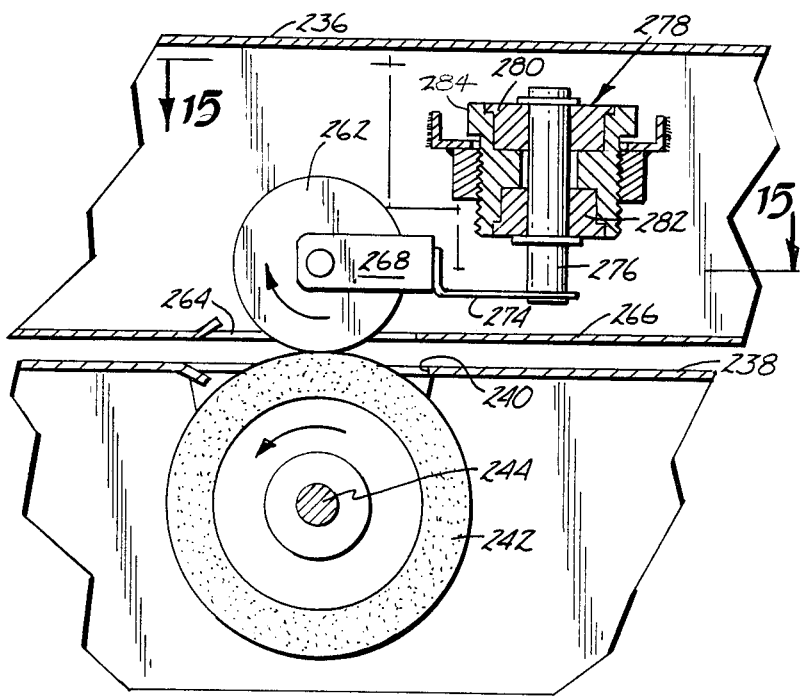
FIG. 14 is a cross-sectional view taken through the paper positioner and with the cover in its closed position and illustrating a typical pinch roller assembly.
Figure 15:
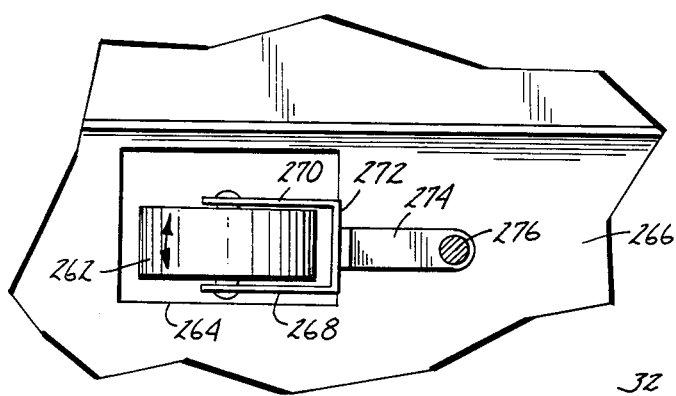
FIG. 15 is a sectional view taken along the line 15—15 of FIG. 14.

Referring to FIG. 14, a detailed view of a typical pinch roller assembly of the alpha/numeric pre-positioner is seen to comprise the cylindrical drive roller member 242 whose peripheral surface is lathe cut to provide a desired surface finish. Mounted directly above the drive roller 242 within the cover member 236 is an idler wheel 262, having a predetermined arc projecting through a rectangular opening 264 formed in the base plate 266 of the cover member 236. The idler wheel 262 is castor-mounted within the confines of cover member 236. That is to say, the idler wheel 262 is journaled for rotation between the parallel legs 268 and 270 of a yoke 272 (FIG. 15) and the yoke has a flexible spring arm 274 extending normally from the base thereof. The arm 274 being secured to a vertical axle member 276 which is suitably mounted in a bearing assembly indicated generally by numeral 278. The bearing assembly 278 includes spaced-apart bearings 280 and 282 having a bore therethrough for receiving the axle 276. Surrounding the bearings is a threaded nut 284, the position of which can be adjusted to adjust force with which the idler wheel 262 presses upon the drive roller 242. The size of the rectangular aperture 264 determines the extent to which the castor assembly may pivot about the axle 276. Typically, a swing of 15° relative to the longitudinal axis of the pre-positioner assembly is adequate to achieve the desired alignment of the paper sheet with the reference edge.

Next, referring to FIGS. 10 and 12, it can be seen that a sheet of paper such as a check form exiting the Input Hopper will pass sequentially between the sets of drive and idler rollers of the alpha/numeric pre-positioner 20. As the form progresses down the line, it is biased to the right (FIG. 10) by the skewed arrangement of the pinch roller assemblies employed until the form is fully engaged within the groove of the reference edge. The form then progresses in line with the reference edge 254. Castor mounting of the idler wheels 62 and the fixed bias mounting of the drive rollers 242 drive the paper forward and to the right of reference edge 254 until the paper is referenced. The paper then progresses forward while the castored idlers 262 pivot to follow in line with the paper. In-line rotation of the pinch idlers 262 cause no scuffing or marking of the upper pre-printed paper.

Also forming a part of the alpha/numeric pre-positioner 20 is a regulator gate 286, the details of which are more particularly illustrated in the sectional side view of FIG. 12. The regulator gate is responsive to detected jam conditions and serves to stop paper flow into the alpha/numeric printer in the event of a jam. It comprises a plurality of transversely aligned rectangular openings formed through the platen 238 and beneath each opening is a stop lever 288 which normally is disposed below the surface of the platen 238 but which, upon actuation of a solenoid 290, causes the fingers 288 to be moved upward, as indicated by the broken line representation in FIG. 12, so as to block the path of travel of paper between the platen 238 and the undersurface 266 of the cover member 236. The manner in which jam detection occurs will be set forth in greater detail below, but suffice it for now to say that at appropriate times, an electrical signal is produced for energizing the solenoid 290.

ALPHA/NUMERIC PAGE PRINTER

Upon leaving the pre-positioner module 20, the serial sheets picked from the Input Hopper trays and deposited upon the upper conveyor assembly thereof ultimately reach the alpha/numeric page printer where the personalized information on the document of FIG. 2 is imprinted on the form. The printer highly suitable for use in the system of the present invention is a Model 2460 Image Output Module manufactured by Delphax Systems, Inc., of Toronto, Canada. Those skilled in the art desiring further information concerning the construction and operation of the page printer 66 (FIG. 3) can refer to the product literature provided by that company. In general terms, and as already set out, the printer employed in the system of the present invention is preferably of the non-impact type that uses an ion-image/toner printer method. In a four-stage process, a charged pattern of dots which are positioned so as to create composite alpha/numeric characters or other graphic symbols is formed on the dielectric surface of a rotating cylinder. Next, as the cylinder rotates, it brings the charged image in contact with a toner brush where the fine particles of the toner are attracted to the charged areas of the cylinder. As the cylinder continues to rotate, it is brought into contact with the paper to be printed upon with sufficient pressure that the image is transferred and fused onto the paper. Subsequent to the transfer process, the drum continues to rotate to a point where excess toner is cleaned from the cylinder and the remaining charge is neutralized, thus making the cylinder ready to accept new charged dot images.

The manner in which digital data recorded on magnetic tape contained on the tape handler 28 (FIG. 1) and the microprocessor-based control electronics cooperate to generate the dot patterns comprising the characters on the surface of the rotating dielectric cylinder will be explained in greater detail when the electronic controls' portion of the system are set out.

PAPER TRANSPORT (FIG. 16)

Figure 16:
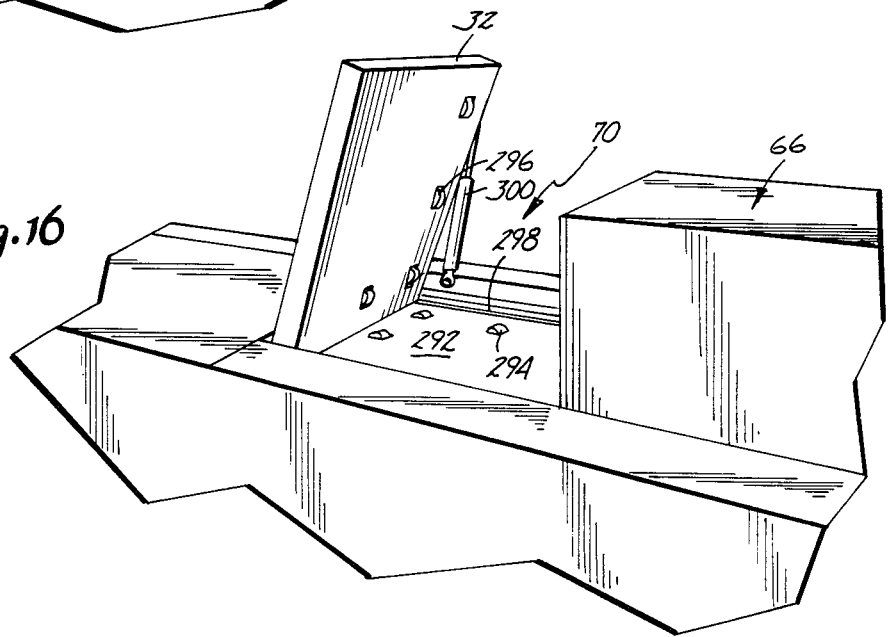
FIG. 16 is a perspective view of the alpha/numeric printer paper exit transport with the cover thereof in the open position.

The paper transport 70 of FIG. 4 which is disposed beneath the hinged cover 32 in FIG. 1 is depicted in FIG. 16. The function of the paper transport is to receive these sheets exiting from the alpha/numeric printer in a serial stream and to move those sheets to the entrance of the MICR pre-positioner module 72. The paper transport 70 is quite similar in its construction to the alpha/numeric pre-positioner module 20 illustrated in FIGS. 10 thru 15 and, hence, a great deal of explanation concerning its construction and mode of operation is not believed to be necessary. Like the pre-positioner, it includes a smooth, sheet metal platen 292 beneath which are mounted a plurality of drive rollers as at 294, the drive rollers being driven by flexible shafts and driven at equal speeds by a pulley/belt arrangement (not shown). Disposed within the hinged cover 32 are matching idler rollers as at 296, the idler rollers being castor mounted in a manner similar to the arrangement depicted in FIG. 14. The rectangular openings in the platen 292 and in the undersurface 293 of the cover 32 through which the drive rollers and associated idler rollers project are skewed slightly with respect to the longitudinal axis of the machine so that sheets exiting from the page printer 66 and engaged by the pinch roller assemblies in the transport will be urged to the right as viewed in FIG. 16, causing a longitudinal edge of the paper sheet to abut a reference edge 298. That reference edge is appropriately aligned so that upon leaving the paper transport module 70, the sheets will be properly oriented for entrance into the MICR pre-positioner. An extendable and contractable strut assembly 300 is pivotally connected to the frame and cover assembly and includes a dashpot, thus allowing the cover assembly 32 to be held in an opened position and to be gently lowered to a closed position wherein the castor-mounted idler wheels 296 contact the mating ones of the drive wheel 294. This particular construction facilitates the clearing of any paper jams and also allows easy cleaning and maintenance of the paper transport module.

MICR PRE-POSITIONER (FIGS. 17-19)

Figure 17:
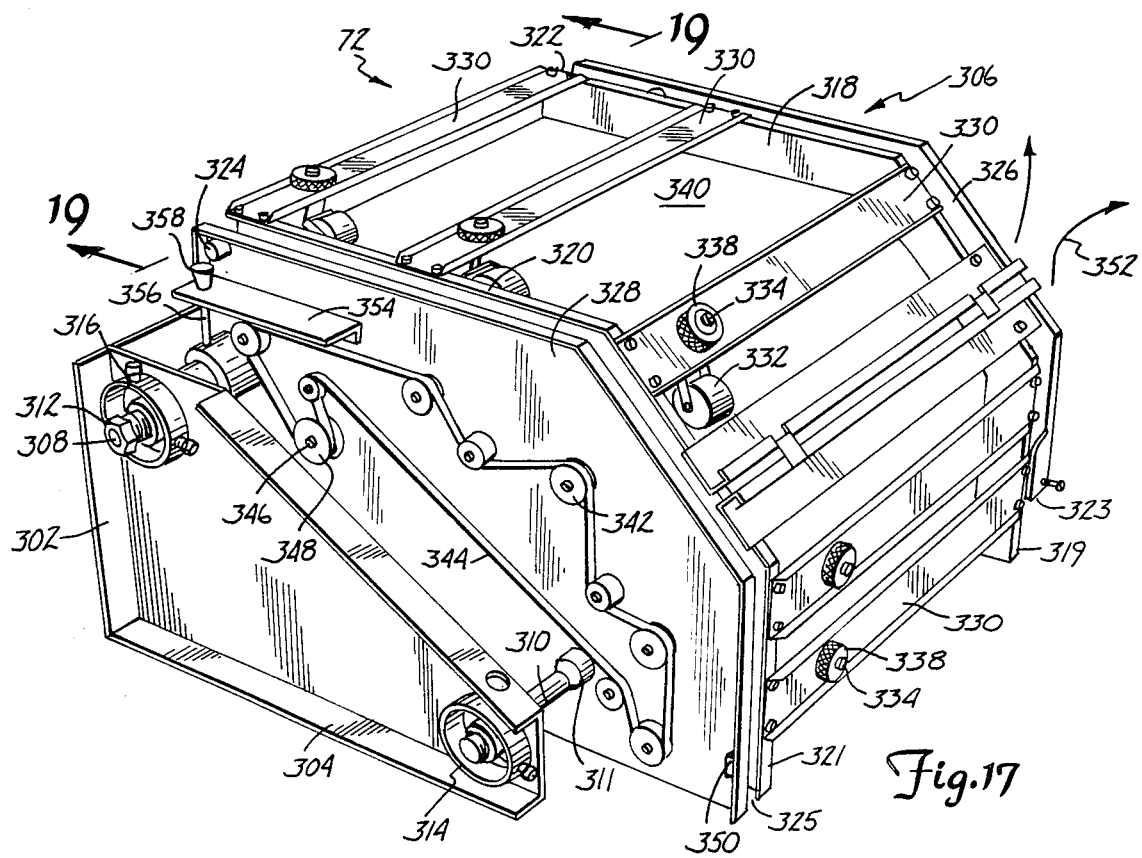
FIG. 17 is a perspective view of the MICR printer pre-positioner transport.
Figure 19:
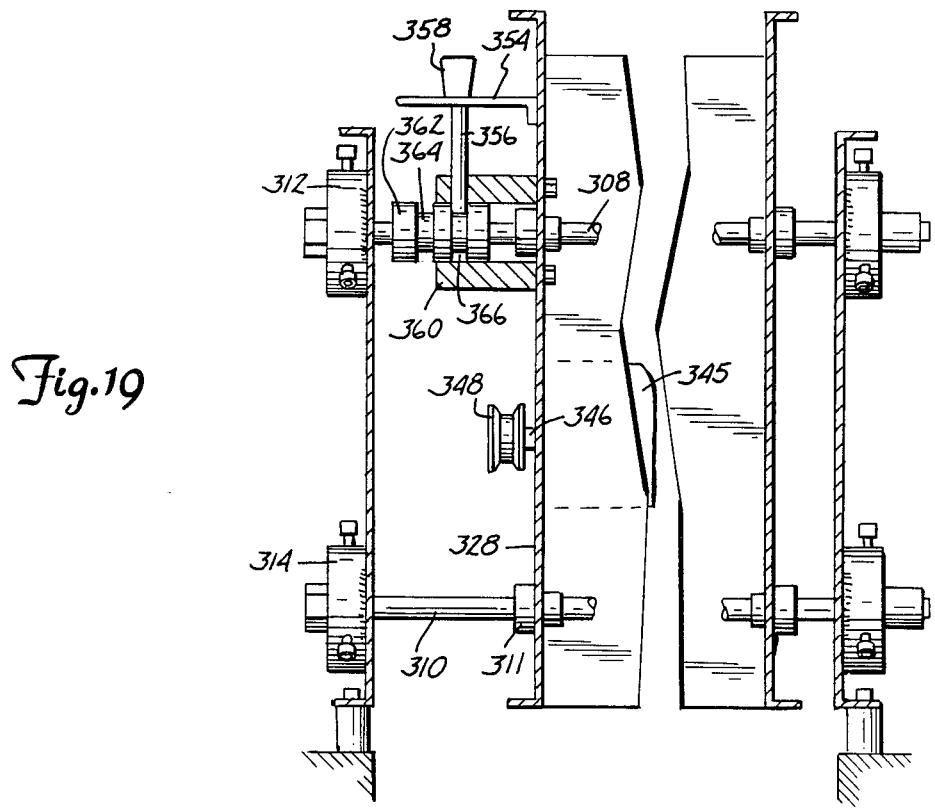
FIG. 19 is a foreshortened sectional view taken along line 19—19 of FIG. 17.

Referring next to FIGS. 17 through 19, the details of the MICR pre-positioner module will be set forth. FIG. 17 is a perspective view taken from the rear side of the machine. Disposed on either side of the module are stationary mounting brackets 302 which are adapted to be bolted to the frame of the machine along a base flange 304. The MICR pre-positioner module is indicated generally by numeral 306 and is slidably suspended between the two stationary frames 302 on either side thereof by means of first and second transversely extending shafts 308 and 310 which pass through the stationary frame members 302 and through sleeve bearings 311 in the body of the MICR pre-positioner module. Disposed on either end of the transversely extending shafts 308 and 310 are chuck mountings 312. The chuck mountings comprise a cylindrical, tubular collar 314 which is welded to the stationary frame members 302. Passing through the side wall of the collar 314 at three equally spaced-apart locations are positioning set screws as at 316. The set screws cooperate with a cylindrical bearing in which the shafts 308 and 310 are journaled. Hence, by relative adjustment of the set screws, the orientation of the MICR pre-positioner support shafts and therefore the pre-positioner module 306 itself can be accurately controlled.

The view of FIG. 17 shows the MICR pre-positioner module 306 with its covers in its down (operating) position. The upper cover comprises a pair of spaced-apart arms 318 and 320 which are pivotally joined at 322 and 324 to the side plates 326 and 328 of the pre-positioner module. Similarly, the lower cover comprises a pair of sealed-apart arms 319 and 320 with pivots 323 and 325. Extending between the pivoting arms 318 and 320 and arms 319, 321 are a plurality of cross braces as at 330. Depending from these cross braces is an idler wheel assembly, the idler wheels 332 again being castor mounted, to permit limited rotational movement of the idler wheel relative to a vertical support axle 334. Surrounding the axle is a knurled knob as at 338. By rotating the knob, the castor wheel assembly may be raised and lowered relative to a cooperating drive roller in the same fashion as in FIG. 14 relating to the paper positiner.

The castor-mounted idler wheels 332 are arranged to pass through generally rectangular openings formed in a sheet metal cover member 340 and disposed below each of said idler wheel is a drive roller which is not visible in the view of FIG. 17 but which is mounted on a drive shaft extending through bearings provided in the side frame plate 328. Secured to the exposed ends of each of these drive shafts is a pulley as at 342, the pulleys being spanned by an endless belt 344 which is arranged to be driven by a motor 345 (FIG. 19) disposed within the interior of the MICR pre-positioner frame. The shaft of the drive motor is seen at 346 in FIG. 17 and secured to this shaft is the drive pulley 348. Thus, each of the drive rollers comprising the paper advance mechanism of the MICR pre-positioner is driven at the same speed by a common motor.

A predetermined arc of the drive rollers projects through a sheet metal platen which extends between the side plates 326 and 328 at locations where that arc engages the idler wheels 332. It can be seen, then, by adjusting the setting of the knurled nuts 338, the degree of pressure exerted between the idler rollers and the drive rollers can be controlled.

With continued reference to FIG. 17, it can be seen that the travel path for the paper passing through the MICR pre-positioner is transformed from a horizontal flow to a generally downward vertical flow. Because the pinch roller assemblies are skewed relative to the longitudinal axis of the machine, the paper is urged into engagement with a reference edge which cannot be seen in FIG. 17 but which is proximate the inside surface of the side plate 328.

The portion of the cover overlying the vertical segment of the paper path is also pivotally joined to the side plates 326 and 328 at locations 323 and 325 permitting that segment of the cover to be rotated in the direction of the arrow 352 to facilitate the removal of paper should it become jammed and to permit cleaning and maintenance.

The format of business checks tends to differ from that of personal checks as far as the location of the lines of MICR printing is concerned. The MICR pre-positioner module includes a device to faciliate the shifting of the pre-positioner to accommodate either style of check. More specifically, and with reference to FIGS. 17 and 19, attached to the side plate 328 is a bracket 354 and passing vertically through the bracket is a pin 356 having a pull knob 358 on the upper end thereof. This pin passes through a tubular collar 360 formed of nylon or other suitable material. Disposed within the tubular collar and fixedly attached to the shaft 308 is a detent member 362. The detent member comprises a cylindrical collar surrounding the shaft 308 and having annular notches 364 and 366 formed therein, the spacing between adjacent notches being accurately controlled. Once the pin 356 is pulled clear of a detent notch, the MICR pre-positioner assembly can be moved laterally along its shafts 308 and 310 until a new desired location is established where the pin 356 again falls into a notch in the detent cylinder 362. The net effect of such an operation is to move the reference edge laterally back and forth relative to the inlet to the MICR printer module where the distance moved is determined by the spacing between notches in the collar 362. This sets the location of the MICR print field on the document.

This completes the description of the MICR pre-positioner. Attention will next be given to the construction of the MICR printer itself.

MICR PRINTER (FIGS. 20 through 26)

Before describing the internal construction of the MICR printer module, consideration will be given to the significant aspects of its mounting arrangement relative to the frame and relative to the MICR pre-positioner module outlet. Referring to FIG. 20, a portion of the frame is identified by numeral 368 and securely bolted to it through isolator bushings as at 370 and 372 is an open box-like sub-frame 374. Welded to this sub-frame at 376 is a generally U-shaped bracket 378. The upper and lower opposed legs of the U-shaped bracket support gimbal mountings as at 380, there being adjustable set screws 382 passing through a cylindrical cup 383 for controlling the centering of a bearing block 384. The bearing blocks contain a spherical bushing surrounding a central shaft 386 at the upper and lower ends thereof, the shaft acting as an axle for a further MICR printer frame assembly indicated generally by numeral 388. Specifically, the frame assembly 388 comprises a pair of spaced apart arms 390 and 392 which are secured to the cylindrical shaft 386 and extending transversely from the ends of the arms 390 and 392 are steel tubes 394 and 396. The tubes 394 and 396 provide a mounting surface for a solid plate 398 to which the MICR print drum drive motor 400 is secured. The motor 400, in turn, is coupled by means of a belt 402 to the rotatable print drum represented in FIG. 20 by dashed lines 404. The mounting plate 398 also has attached to it the magnetic ink ribbon playout torque motor 406 and associated take-up spool torque motor 408.

Figure 24:
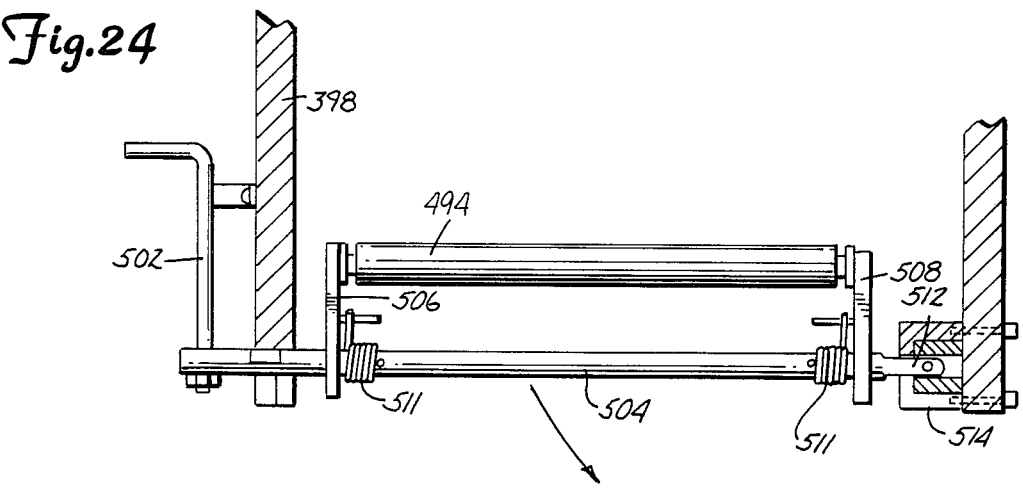
FIG. 24 is an enlarged sectional view taken along the line 24—24 of FIG. 23.

Also bolted to the frame assembly 388 is a pull or handle 406 which the operator may grip to swing the printer mechanism to its open position as shown in FIG. 24. Numeral 408 identifies a lever which is arranged to pivot about a fulcrum 410. Associated with the other end of the lever but not shown in FIG. 20 is a latch assembly 411 used to lock the frame 388 in its closed or operating position. This latch arrangement is illustrated in FIG. 23.

FIG. 21 is a view illustrating the portion of the MICR printer contained within the open box-like frame structure 374 in FIG. 21. Affixed to the frame 374 are parallel, spaced-apart end plates 412 and 414 and extending between them are upper and lower cross bars 416 and 418. Bolted or otherwise affixed to the mounting plate 414 are paper advance stepper motors 420 and 422, the output shafts of which are suitably coupled by coupling shafts 424 and 426 to one-way clutch members 428 and 430. A shaft 432 is journaled for rotation in brackets 334 and 436 and secured to the shaft 432 are first and second drive rollers 438 and 440. Disposed behind the drive rollers 438 and 440 and only partially visible in the view of FIG. 21 are cooperating paper pinch rollers 442 and 444. These parts are more clearly seen in the veiw of FIG. 22.

In a similar fashion, the one-way clutch 430 is coupled to a shaft 446 to which is attached a set of drive rollers 448 and 450. The drive rollers 448 and 450, in turn, cooperate with the abutting surfaces of idler or pinch rollers 452 and 454. Disposed adjacent to the pinch roller pairs 450, 454 is a photoelectric paper sensing device 456 which detects the leading edge of a sheet as it progresses through the MICR printer.

Paper to be printed upon enters the MICR printer in the direction of the arrow 458 from the outlet slot of the MICR pre-positioner module and the paper is directed between the pinch roller pairs 438-442 and 440-444. As the leading edge of the sheet of paper being fed through the printer passes between the aforementioned upper paper pinch roller, it is fed between a flexible plastic (Mylar) hold-down mask 460 and the metal face of the hammer bank which is identified by numeral 462. This face plate 462 contains a plurality of rectangular openings as at 464 behind which are poised a corresponding plurality of magnetically actuatable hammers. Under control of the electronics portion of the present invention, the hammers are appropriately energized so as to force the paper against the magnetic carbon paper and against the type font contained on a rotating cylinder, all as will be more particularly described with the help of FIG. 22. The face plate 462 also includes beneath each rectangular opening a V-shaped opening as at 466 with the metal surrounding the opening being rounded so as to avoid any sharp edges which might otherwise catch and impede the flow of paper past the print hammers.

In that it is imperative that precise, rigid control be maintained over the location on which the MICR characters are to be printed, initial set-up of the machine of the present invention must allow for accurate alignment of the hammer bank relative to the surface of the drum containing the print fonts. To accommodate accurate positioning, it has been found expedient to incorporate eccentric pins as at 459 and 461 in FIGS. 20 and 21. By appropriately rotating the pins during initial set-up, each side edge of the MICR printer hammer bank frame 374 can be raised and lowered by controlled amounts and when the desired positioning is obtained, the fastener nuts 370 and 372 can be tightened to maintain that condition.

Before discussing further features of the pivoting frame assembly 388, consideration will be given to the overall operation of the MICR printer and, in this regard, reference will be made to the mechanical schematic diagram of FIG. 22.

Figure 22:
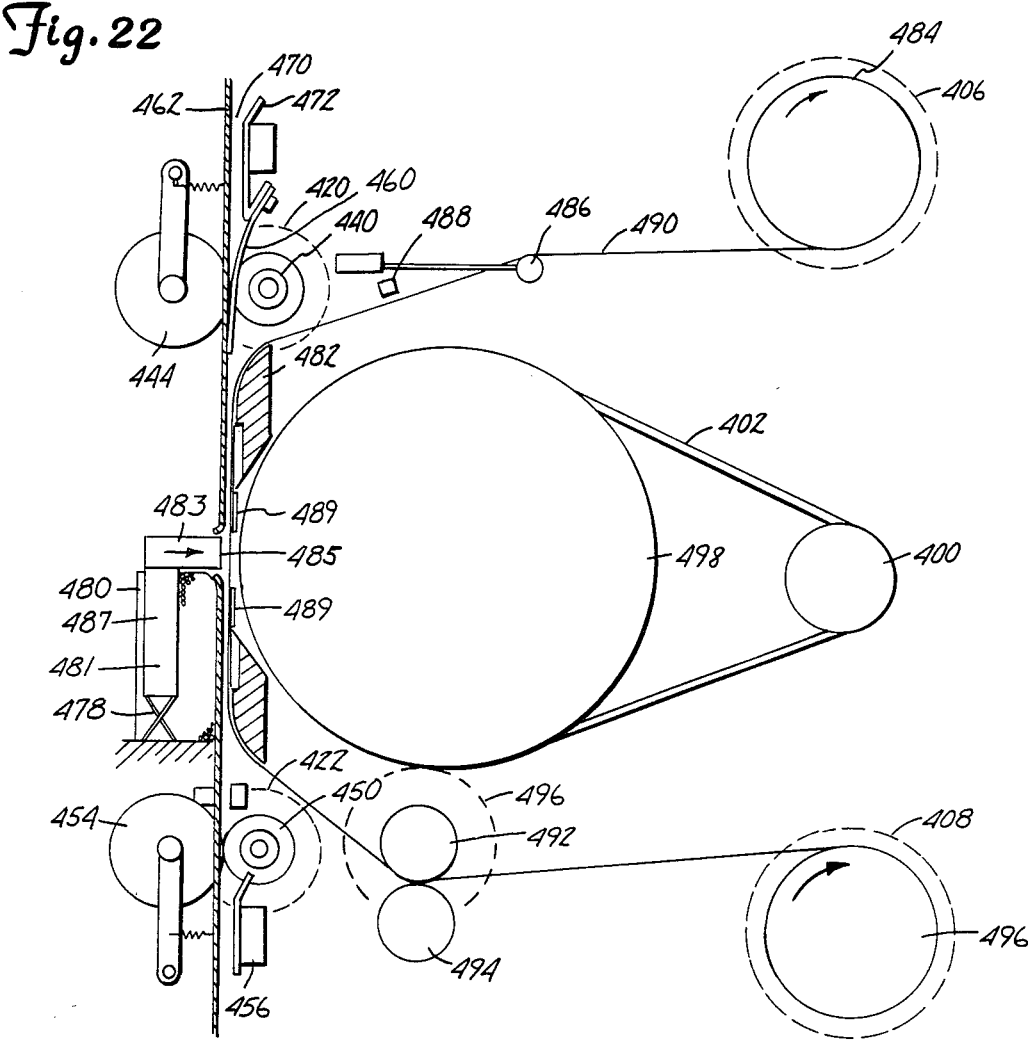
FIG. 22 is a side diagrammatic view of the MICR printer portion of the system.

With reference to FIG. 22, sheets of paper exiting from the MICR pre-positioner module 72 are fed into the gap 470 between the face plate 462 and a guide member 472. The sheets are then gripped between the drive roller 440 which is driven step-by-step by a motor 420 and the associated tension arm mounted pinch roller 444. The paper is advanced in incremental steps under control of the stepper motor 420 with the leading edge of the paper next passing between the back-up plate 462 and the Mylar mask 460.

The side view of FIG. 22 shows a cross-section through the hammer bank. The hammer bank comprises a stacked, side-by-side arrangement of permanent magnets as at 480 disposed on either side of a hammer 481 where each hammer consists of a generally rectangular mass 483 having a concave face 485, the mass being supported upon a staff 487, the staff containing an electrical coil (not shown). The staff, in turn, is supported on pivot springs 478 which also serve as the electrical contacts coupling external leads to the wire coil contained within the hammer staff member 487. When a current impulse is made to flow through the coil, a magnetic field is created tending to force the staff 487 outward from its disposition between two aligned permanent magnets and, in doing so, the hammer mass 483 will project through the openings 464 in the face plate 462, forcing the paper against the magnetic ink ribbon 490 backed by the print drum 498. A hammer bank useful in the MICR printer of the present invention is obtained commercially from Data Products, Inc. of Woodland Hills, Calif., and those desiring further information concerning the design and construction thereof may obtain same through that manufacturer.

Disposed immediately in front of the windows or apertures 464 in the face plate 462 is a ribbon guide member 482 and a ribbon impregnated with magnet ink is played off of a supply reel 484 over a tensioning device termed a ribbon dancer 486 and past a foil sensor 488 which is designed to sense the end of the ribbon on the supply reel 484 so that the ribbon drive will be de-activated as the supply becomes exhausted. The ribbon 490 is fed over the ribbon mask 482 and over Mylar stripper ribbons 489 and in front of the apertures 464 formed in the face plate 462. The ribbon 490 then passes between a ribbon drive roller 492 and a cooperating pinch roller 494, the drive roller 492 being incrementally stepped by a stepper motor 496. From there, the ribbon winds about a take-up reel 496 which is driven by a torque motor 408. The torque motors 406 and 408 maintain a predetermined tension in the ribbon 490 while the stepper motor 496 and associated drive and pinch roller impart step-by-step incremental motion to the ribbon.

Numeral 498 identifies the print drum which, in the preferred embodiment, comprises a 40-column drum containing, for example, two sets of fourteen E13B characters which are disposed on the surface of the drum in a checkerboard pattern so as to reduce the latency time of the printing system. Typically, up to five MICR lines of print may be impressed upon each sheet as it passes through the drum printer station. Forty contiguous MICR characters may be printed at any one time. The E13B character font is the standard of the American Bank Association. It is, of course, possible to use optional drums containing CMC-7 fonts which is the standard of the European Computer Manufacturers Association.

FIG. 23 illustrates the portion of the MICR printer assembly that is mounted upon the swinging frame assembly 388 of FIG. 20 when in its opened position, such as when a used MICR carbon ribbon is to be removed and replaced. When in this orientation, the latch bar 411 secured to the end of the latch handle 408 can be observed. The notch 413 is intended to mate with a pin (not shown) disposed on the far side of the machine's frame to positively latch the swingable frame and the printer components mounted therein in the closed position where the print drum 498 and MICR ribbon 490 are disposed immediately in front of the face place 462 through which the hammers project upon actuation.

Also visible in the view of FIG. 23 is the ribbon pinch roller latch arm 502. The pinch roller itself is hidden from view in FIG. 23 by the ribbon mask member 482. The view of FIG. 24, however, more clearly illustrates the operative parts of the pinch roller assembly. The lever 502 is coupled to a latching rod 504 which extends across the width dimension of the MICR printer. Journaled on this rod are ribbon pinch roller support arms 506 and 508, the pinch roller itself, 494, being journaled for rotation proximate the ends of the arms 506 and 508. Torsion springs 511 are disposed about the latching rod 504 and are configured to exert a biasing force tending to urge the arms 506 and 508 as well as the pinch roller 494 into engagement with the step motor driven ribbon drive roller 492 when the end portion 512 is disposed in its latch socket 514 affixed to a side mounting plate.

By swinging the lever 502 down and holding it in a vertical position, it is possible to pivot the bar 504 so that it is generally perpendicular to the axis of the drum assembly. When in this position, it is possible to replace the ribbon spools by grasping the empty supply spool and pushing it toward a spring-loaded spool holder (not shown) whereby it can be removed from the assembly. The same approach may be then used on the take-up spool to remove it. When reloading the MICR printer with a new ribbon, the operation is repeated in a somewhat reverse order, the last step being to swing the tension bar 504 back into the latching socket 514 and again rotating the lever 502 clockwise to a horizontal position as shown in FIG. 23. This brings the ribbon pinch roller 510 to bear on the ribbon and associated drive roller.

EXIT HARDWARE

Referring again to the schematic mechanical diagram of FIG. 18, it can be seen that, as the paper exits the lower pinch rollers 450 and 454 of the MICR printer, the sheets are presented to a solenoid-controlled diverter indicated generally by numeral 516. For purposes of reference, this is the same as diverter 82 in the schematic diagram of FIG. 4. Specifically, an electrical solenoid 518 has its armature thereof coupled through a linkage 520 to a pivotable sheet metal flap 522. When the solenoid 518 is de-energized, the paper progresses down the output conveyor 524 between mating sets of pinch rollers and through a perforator station 86, and then to the output hopper 90. Alternatively, when the solenoid 518 is energized, the diverter flap 522 moves to the dotted line position shown in FIG. 18 and papers exiting from the MICR printer station 74 are directed into the alternative hopper 84.

FIG. 25 illustrates the constructional features of the perforator station 86. A motor (not shown) is arranged to drive a shaft 526 to which is affixed a pair of circular disks (anvils) 528 and 530. Poised above the anvil arrangement just described is a frame-supported bar 534 of generally rectangular cross section. Slidably supported on the bar 534 are bearing blocks 536 and 538 in which are journaled the knife-edged perforator disks (cutters) 540. A lever-operated cam 542 on each of the bearing blocks allows the knife-edge perforator disks to be raised from or engaged on the anvils at a desired tension for perforating. While not particularly illustrated in FIG. 25, there may also be incorporated within the bearing blocks 536 and 538 a means whereby the pressure exerted between the perforator disks 540 and the underlying anvil may be adjusted to achieve that desired tension.

Having described in considerable detail the mechanical features of the preferred embodiment of the invention, consideration will next be given to the details of the electronic control system incorporated therein.

ELECTRONIC CONTROL (FIG. 26)

The electronic control system of the present invention receives control and status information from various sensors spread along the path of travel of the paper through the machine and format information and data to be printed from magnetic tape storage and from an operator display terminal. In accordance with a program of instructions, it emits commands to the various actuators, i.e., solenoids print hammers, drive motors, etc., for coordinating the overall paper movement and printing operations.

Figure 26A:
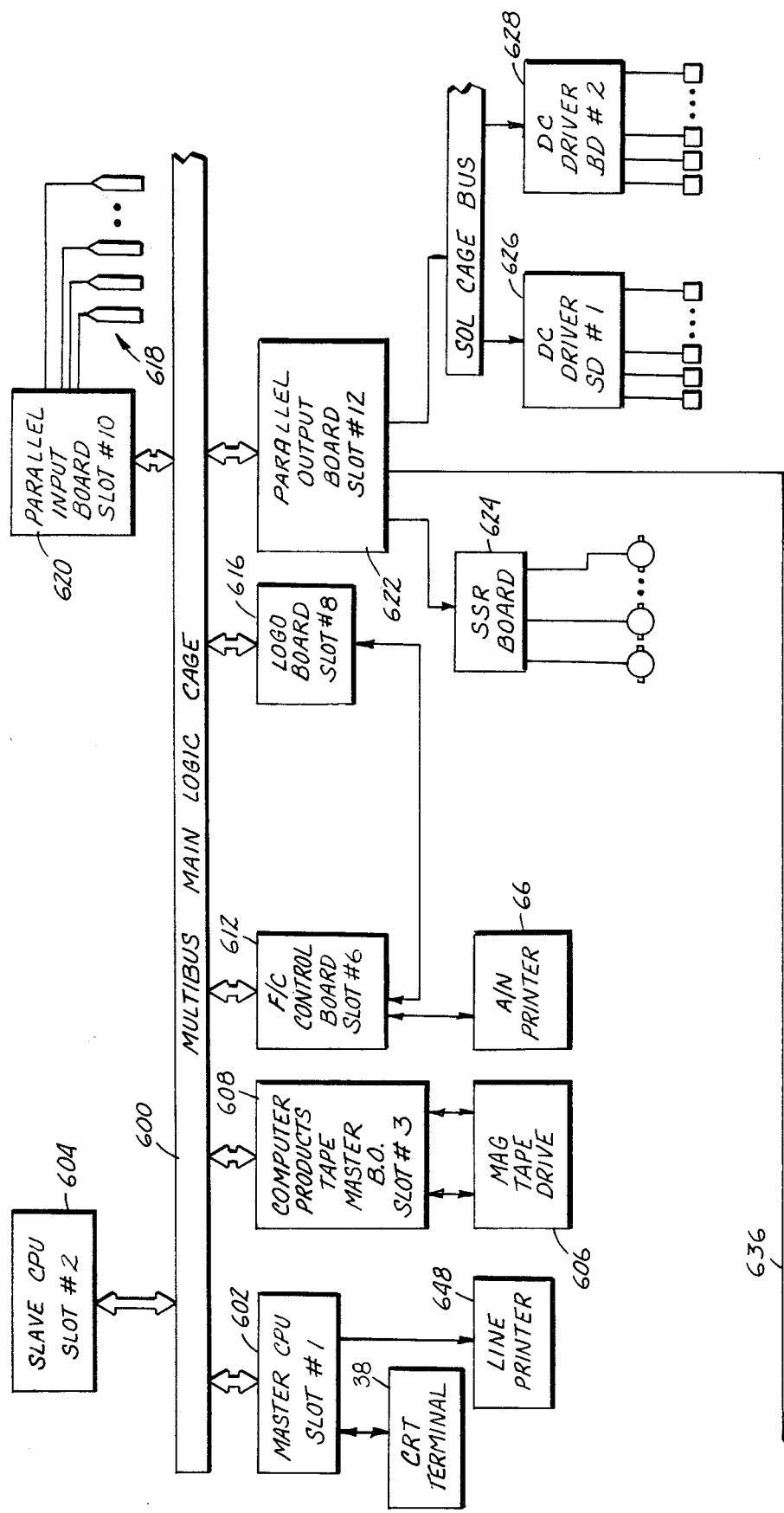
FIGS. 26A and 26B are block diagrams illustrating the electronic portion of the system of the present invention.
Figure 26B:
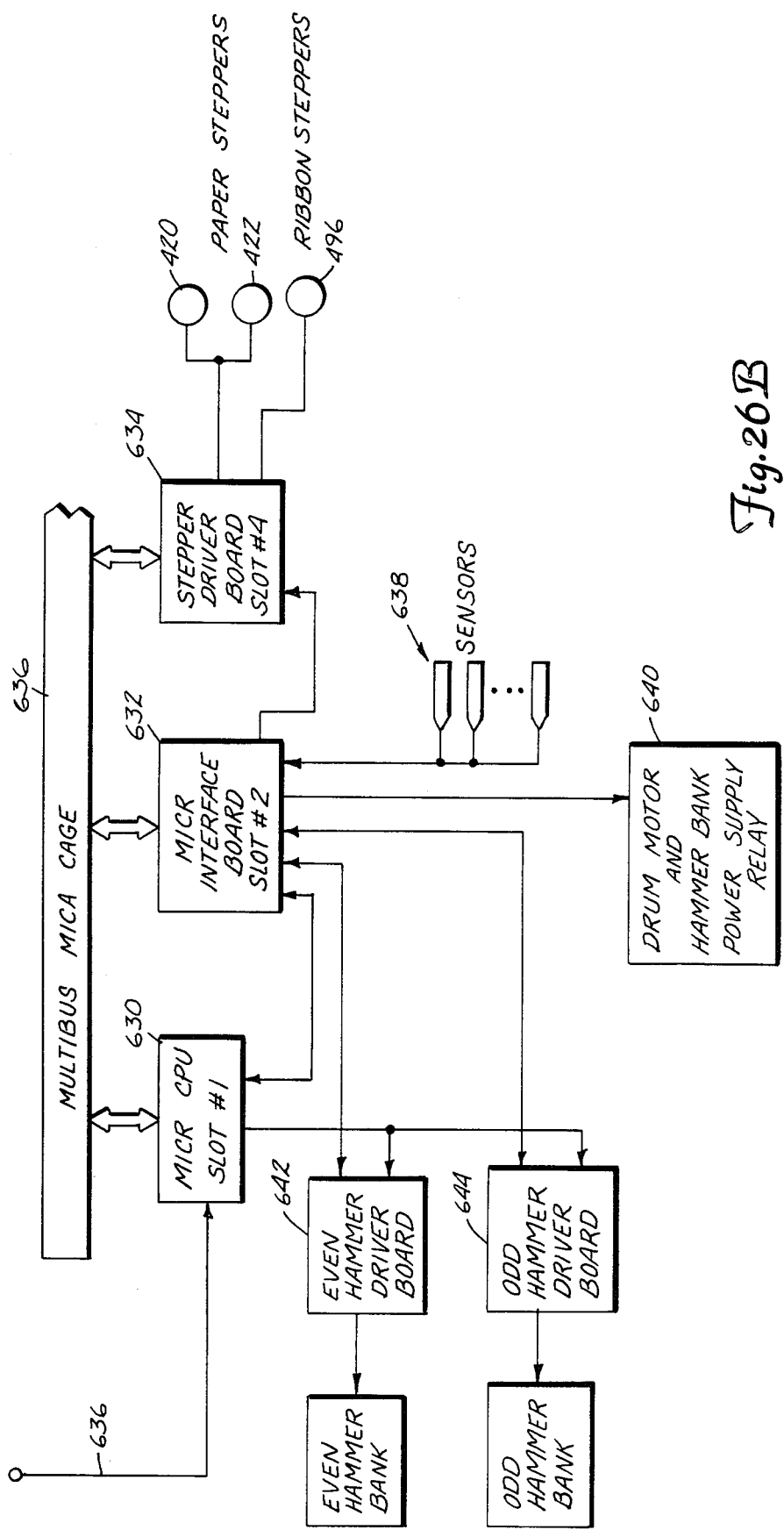

Referring to FIG. 26, there is shown a block diagram illustrating the various functional components comprising the control system of the present invention. As can be seen from the drawing and as will be set forth in greater detail, the various electronic modules are joined together via a common data bus 600. Specifically, the system includes a Master CPU 602 which may, for example, be an Intel Model 86/14 microprocessor. In addition to the Master CPU, the system also includes a further microprocessor termed the Slave CPU 604, which is tied to the common bus 600. The Slave CPU may also be an Intel 86/14 device, but since other microprocessors can be employed for controlling the system of the present invention, there is no intention to limit the invention to one incorporating this particular type.

Also tied to the common bus is a magnetic tape drive 606 which communicates through a control module 608 termed the Tapemaster with other devices hung on the bus 600. The control unit 608 is preferably a Tapemaster Model TM04 which is available through Computer Products, Inc. of Plymouth, Minn. The Tapemaster unit 608 functions as a data buffer and also controls the interfacing of the tape deck with the other devices communicating via the common bus 600 so that data from the magnetic tape unit can be transferred on a Direct Memory Access (DMA) basis into the RAMs associated with the Master CPU 602 and the Slave CPU 604.

The Delphax alpha/numeric printer is identified by numeral 66 and it communicates with the other components of the electronic control system via the common bus 600 via the circuitry on the Format/Controller which, in FIG. 26 is seen to comprise a control board 612 and a logo board 616. The Slave CPU 604 functions with the Format/Controller boards 612, and logo board 616 at a lower speed than the communication between the Delphax printer 66 and the modules 612–616. The Slave CPU 604 provides the Format/Controller Board 612 with actual character code and positioning data. The function of the Format/Controller and logo is to convert that data into signals for creating the ion dots in prescribed patterns to define the character and to specify the location on the dielectric drum where that pattern is to be formed. Typically, one byte of data comprising a character code originating at the Slave CPU 604 may result in the transfer of up to 96 bytes of data from the Format/Controller board 612 to the Delphax alpha/numeric printer 66.

From the standpoint of overall machine control, the system of the present invention includes various sensors for detecting the progress of paper through the system and means for creating actuating signals for delivery to the appropriate solenoids, motors, print hammers, etc. The various sensors employed in the system are represented diagrammatically and identified generally by numeral 618 in FIG. 26. The sensors themselves are coupled to an interface board 620 whose principal function is to perform signal conditioning and matching so that the data signals coming from the sensors 618 are compatible with the other devices tied to the common bus 600. As will be set out in greater detail, the sensors 618 primarily communicate with the Master CPU 602 in that the Master CPU is the device principally involved in controlling the paper flow. The external function commands emanating from the Master CPU 602 are coupled through the parallel output board 622 to the motors and various solenoid actuators via a solid state relay SSR board 624 associated with the various motors and through solenoid driver boards 626 and 628. The solid state relays and drivers provide the necessary current amplitudes and wave shapes (timing) for appropriately energizing the solenoid actuators involved.

The system of the present invention includes a still further microprocessor which is primarily dedicated to controlling the MICR print functions. This microprocessor is identified by numeral 630 in FIG. 26 and is coupled to a data/control bus 636 to allow communication between it and between a MICR interface board 632 and a stepper motor driver board 634 also tied to the common bus 632. The CPU 630 is preferably a 8-bit device and may typically be an Intel Type 80/10. A serial communication line 636 couples the MICR CPU 630 to the common bus 600 via the parallel output board 622 previously mentioned. This allows serial RS 232 data to be exchanged between the Master CPUs and the MICR CPU.

The MICR interface board 632 includes a further CPU chip and, in the preferred embodiment of the present invention, is an Intel Type 8748 device. That CPU is assigned the task of controlling the two paper stepper motors 420 and 422 of FIG. 21 and the ribbon stepper motor 496 of FIG. 22. It may be recalled that the MICR printer, being an impact printer, must arrest the paper and ribbon motion prior to hammer impact and then, when impact has occurred, the paper and ribbon must be precisely moved so as to present fresh ribbon and a new current location to the print drum and hammer assembly. The stepper driver board 634 is, again, merely an interface device for insuring that the stepper current signals delivered to the motors are of the appropriate amplitude and wave shape. Tied to the input and output ports of the MICR interface board 632 are further sensors 638 and a drum motor and hammer board power supply relay 640.

In order to make the hammer bank assembly more compact, it is mechanically structured so as to comprise two halves termed the even bank and the odd bank. The two banks are stacked such that the hammer masses 483 (FIG. 22) of each bank are in line while the staffs 480 and associated permanent magnets 478 extend on an alternating basis in opposed directions. It is for this reason that the electronic system of FIG. 26 includes a first hammer device board 642 associated with the even bank and a second hammer driver board 644 associated with the odd bank. As is indicated by the drawing of FIG. 26, control/status information is transferred between the hammer driver boards 642 and 644 and the MICR interface board 632 while data is coupled to the hammer driver boards from the MICR CPU 630.

The operator's control station 38 (FIG. 1) is seen to comprise a video display unit 40 and a keyboard entry device 42. This I/O terminal is tied to the serial I/O port of the Master CPU 602. If it is desired to obtain a hard copy printout of status information, a line printer, as at 648, may also be tied into an output port of the Master CPU 602.

SOFTWARE (FIGS. 27–29)

To understand the details of the construction and operation of the electronic aspects of the present invention, it is deemed beneficial to describe the software executed by the Master and Slave CPUs and by the MICR CPU. In this regard, the flow charts pertaining to the software organization and the functional aspects thereof will be set forth. However, because skilled programmers may implement the software in a variety of ways, it is not deemed necessary to set forth the detailed machine coding, it being understood that those skilled in the art would be in a position to prepare the necessary instruction listings once the software architecture is understood.

Figure 27:
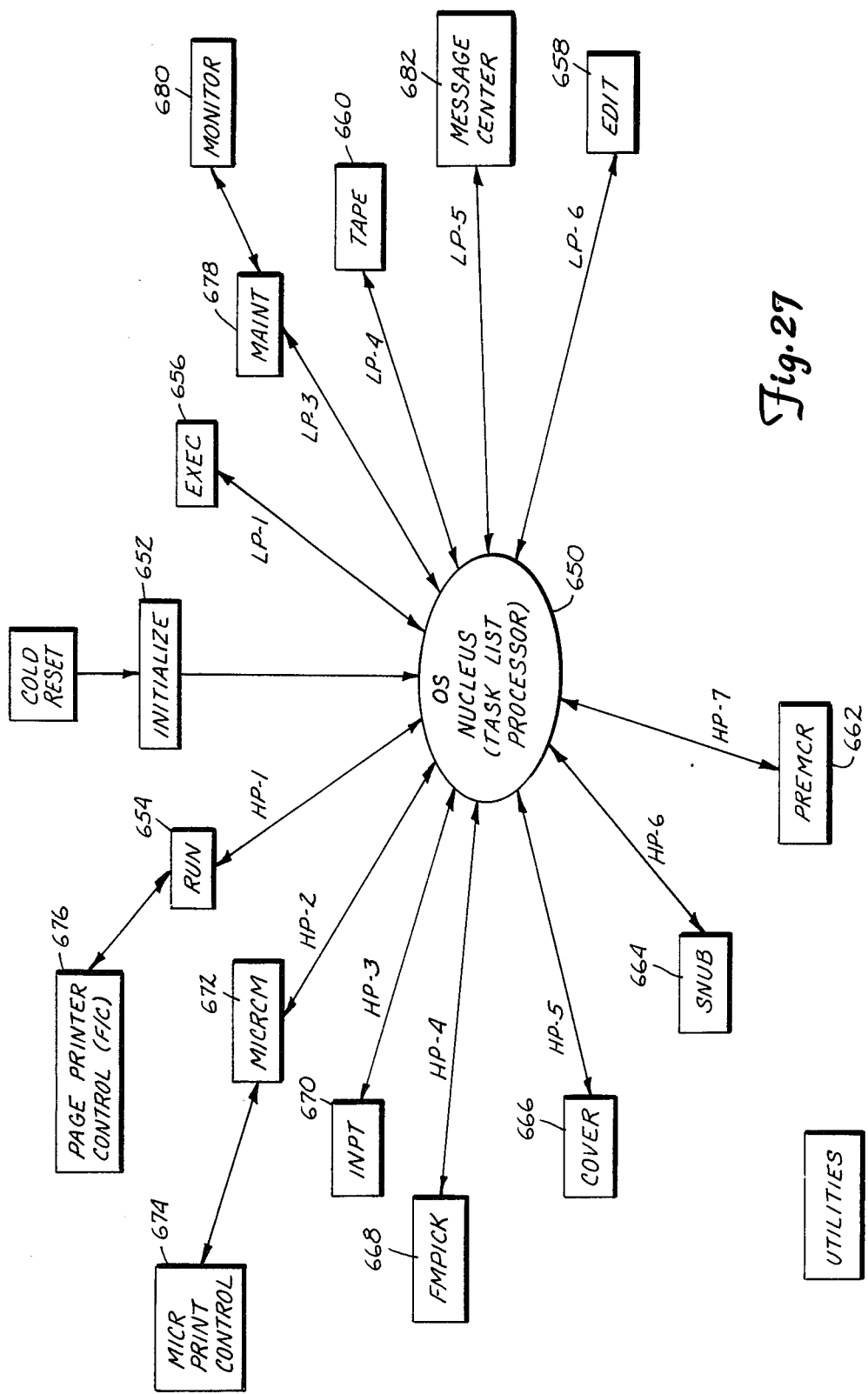
FIG. 27 is a diagram illustrating the software organization employed.

FIG. 27 diagrammatically sets out the Operating System (O.S.) software organization. It is seen to comprise a "Nucleus" 650 surrounded by a plurality of software structured tasks, some of which may normally be dormant but which can be "awakened" so that the software comprising that task can be executed. Upon power-up of the system, the INITIALIZE routine 652 signals the O.S. 650 which, in turn, proceeds down a list of all of the surrounding tasks to see which one or ones may be awake and, upon finding such a status or condition, directs the task to execute the code associated with it.

On each of the lines radiating from the O.S., there is a designation indicating the connected task's relative priority. HP-1 associated with the RUN task 654 is of a higher priority than any of the remaining High Priority (HP) tasks 2-7. Similarly, the EXEC (executive) task 656, which is assigned priority designation LP-1, is of a higher priority than the EDIT task 658, which is assigned the lowest priority (LP-6). In general, the High Priority tasks have to do with the movement of paper through the system whereas Low Priority tasks generally relate to activities where human interaction is involved and where the relatively slow data transfers from magnetic tape are involved.

It is to be further understood that the EXEC tasks 656 is continuously running so long as the system is powered up. Then, based upon commands coming from the CRT Terminal 646 (the operator's control station 38 in FIG. 1), it will proceed to "awaken" other tasks for execution. For instance, an operator may enter a command such as "READ" on the keyboard 42. The software comprising the EXEC task 656 then analyzes that command and proceeds to activate the TAPE task 660 so as to ultimately cause it to read a block of data from the magnetic tape unit. At the time that the O.S. (Nucleus) progresses through tasks of higher priority which might be active and ultimately arrives at the TAPE task 660, and by executing the instructions comprising the TAPE task, the data in question would be entered into the RAM of the Master CPU. Once that string of instructions comprising the TAPE routine 660 has been executed, control again returns to the O.S. which again scans through the list of tasks in order of priority.

The search for active ("awake") tasks by the O.S. is quite fast. Specifically, it is guaranteed that at least every 10 milliseconds control reverts to the O.S. In this fashion, the High Priorty tasks can be serviced on a timely basis.

It should also be mentioned at this point that certain of the Low Priority tasks are interruptable. That is to say, if during the course of execution of a Low Priority task, the Operating System signals that a High Priority task is requesting service, the Low Priority task can be interrupted in favor of the higher priority task and, when all higher priority tasks have been executed, control again will return to the particular lower priority task which had been interrupted at just the place in the routine where the interrupt occurred.

To understand the nature of each of the tasks, it is deemed helpful at this point to mention briefly the overall function performed at the time that the O.S. recognizes each task for execution. The task labeled PREMCR 662 and having priority rank HP-7 relates to the paper transport 70 and the MICR pre-positioner 72 in FIG. 4. These units control the flow of paper from the page printer and reorient the flow path from horizontal to vertical prior to entrance of the paper into the MICR printer module. The SNUB 664 are tasks principally controlling the A/N pre-positioner module 64.

The COVER task 666 controls the diverter section 516 in FIG. 18 and also an optional bank of cover hoppers which selectively allows cover stock to be inserted into the paper stream at preprogrammed points.

The acronym FM PICK stands for "Form Pick" and pertains to the input hopper module 12 such that sheets from the various paper trays may be drawn in a desired sequence and deposited on to the upper conveyor.

The task 670 captioned INPT stands for "Input", and it governs the operation of the upper conveyor portion of the input hopper. Thus, the FM PICK task 668 selects the appropriate form from one of the plurality of input hopper trays, and INPT 670 controls the transfer of that document to the alpha/numeric pre-positioner module 64.

The task captioned MICR CM 672 controls the communication between the Master CPU 602 and the MICR cage 636. The software routine captioned MICR PRINT CONTROL 674 is not directly accessed by O.S. 650. It executes in coordinated fashion with the task, MICR CM, to accomplish paper/ribbon positioning, hammer firing, etc.

The RUN task 654 controls all of the so-called track tasks, i.e., those tasks dealing with the flow of paper through the system.

The MAINT task 678 controls the testing of individual items in the machine to determine if they are working properly. It ties in with the MONITOR task 680 which does not itself receive control directly from the nucleus 650.

TAPE 660 communicates, via the Tapemaster control module, to the tape transport. Thus, both data and control signals flow back and forth between the Tapemaster and the common bus.

MESSAGE CENTER exerts control over a predetermined upper portion of the screen of the CRT 40, that portion of the screen being dedicated to the presentation of certain status information. For example, it may indicate how many sheets have been run through the system, what was the last data block read from TAPE, the particular format control block being worked on, the type of forms in each hopper, etc.

The EDIT task 658 comprises the software involved in the editing and establishment of controlling arrays in memory.

The system of the present invention is programmed through the use of the operator's control station 38, especially the keyboard entry device 42. Using the keyboard, data blocks (print data) as well as machine control information in the form of "FORMAT" and "CONFIGURE" blocks may be entered into the RAM memory of the system. Where a prewritten data tape exists, the tape, operating through the Tapemaster 608 (FIG. 26), may be read to provide the print data and, then, only the "CONFIGURE" and "FORMAT" blocks need to be specially created through the use of the keyboard. The keyboard-entered data can be prestored on magnetic tape as well. The memory is partitioned into arrays, each array being an area in memory assigned to store program information. The aforementioned blocks are created in separate arrays. Once a block is created in an array, that block can be read from the RAM and recorded on magnetic tape, with each such block being identified by a suitable Block Identification Number (BIN). Specifically, the memory may comprise of four basic arrays termed, respectively, "DATA", "FORMAT", "JOBS" and "CONFIGURE". With reference to FIG. 28, the "DATA" array is shown at 28A and is the memory spaces assigned to the storage of raw text to be printed. It comprises a plurality of fields, each corresponding typically to a printed line. Thus, a print data field is identified by a numeric character termed a Block Identification Number and is terminated by a carriage return character stored on the tape, This array can be manually entered through the operator's control station 38. The "DATA" array may typically comprise memory sufficient to store 4,090 bytes of print data plus six additional bytes which are reserved for recording Block Identification Numbers.

The "FORMAT" array defines what particular fields are to be placed on the paper form and where on the form the printing is to take place. It is an area in memory used primarily by the Slave CPU 604, which is responsible for doing all of the formatting of the data. FIG. 28B graphically characterizes the "FORMAT" array. The "FORMAT" array block can be considered as being divided into two parts, one identifying form names to be printed and the other describing the print position and type of print for each print line to be printed in the "DATA" entry. The Field Number refers to a block of print data preceding a Carriage Return (CR) character. A field of tape generally corresponds to a line of print on the document being printed. The Field Number can then be used as a search criteria when scanning for a given block. In addition to specifying a Field Number, the "FORMAT" array may also include data bits specifying whether left, center or right justification is to be employed on the printed pattern of information. The X and Y coordinates in the "FORMAT" array specify the horizontal and vertical position of each line of print on the document. Because the A/N page printer 66 employed creates an image using a 240-dots/inch matrix, the X and Y coordinates are measured in units of 1/240th inches. Finally, a font identification in the "FORMAT" array is used to specify up to six different type styles to be used in printing a data field with the alpha/numeric page printer. Only one MICR font is used.

Where it is desired to print a design or logo on a document, the character "L" is inserted in the "Font" column of FIG. 28B which character specifies "logo". The X and Y entries in the "FORMAT" array are then used to specify the position where the upper lefthand dot of the logo is to be placed. Since no justification is employed with the printing of logos, no entry is placed in the "LCR" column when specifying a logo. The Field Number column is made to contain an identification number for the field in data which contains the desired logo I.D. number. Rather than placing the logo data directly in the "Field" column, a logo ID number is used as a label, and that ID number is used to address the pattern data previously stored into the LOGO RAM, usually from magnetic tape. As will be later explained, under control of the EDIT task, the data defining the dots comprising the logo can be appropriately fed to the alpha/numeric printer whereby the logo can be printed at a desired location on the paper.

In a somewhat related fashion, up to six different types of forms or sheets may be placed in the different trays of the input hopper. Each different type of sheet to be printed upon may have a separate name for it, e.g., "Check", "Deposit", Roster", etc. The name is stored in the "Form Name" table of the "FORMAT" array and is made to carry over as an address for coordinating the form type with the desired printing format to be used on it.

The "CONFIGURE" array stores machine control information relating to system conditions needed to run an operation. For example, stored in the "CONFIGURE" array are data specifying the forms to be picked, the identification of which forms are in a particular hopper, the length of the forms, the number and location of lines where the MICR data is to be printed, the type of code contained on the tape (ASCII or EBCDIC), the identification of the Output Hopper to be used (alternate or external), and the contents of the cover hoppers (empty, front cover or back cover).

The "FORM" array is a subset of the "CONFIGURE" array (FIG. 28D) and contains the names of the forms being used and what Input Hoppers those forms are located in. For example, a form may have the name "CHECK", and the "FORM" array may indicate that the "CHECK" forms are contained in hoppers 1–4. Then, using the "Sequence" table in the "CONFIGURE" array (FIG. 28D) which contains a series of sequence statement lines where each such line includes a form name or a command word and a repeat count, it is possible to have the machine carry out a sequence of steps which are linked together. For example, a first statement might be "READ" and the next statement in the Sequence table might be a form name such as "CHECK". This may be followed by a further form name such as "DEPOSIT". Then, upon execution, the machine first reads a block of data from the TAPE 606 and stores that information in memory. Next, upon detecting the entry "CHECK" in the Sequence table, the control will revert to the Hopper Translation Table portion of the "CONFIGURE" array to determine which hopper contains the "CHECK" form. Upon detecting the form "CHECK", the Slave CPU 604 will create the format to be used with the "CHECK" form by referring to the aforementioned "FORMAT" array (FIG. 28B) which is assigned to the name "CHECK". By designating the number of such forms to be picked, upon completion of the selection of the designated number, control moves to the next statement line in the Sequence table which, as indicated above, is assumed to be "DEPOSIT". Here, the control system will cause a preprogrammed number of deposit slip forms to be selected from the input hopper tray associated with that form and inserted in the stream of documents passing serially to the page printer.

As is well known, check blanks in a checkbook are generally serially numbered. The system of the present invention is readily programmable to apply that serial numbering to sequential sheets as they pass through the alpha/numeric printer and through the MICR printer. The starting check number is inserted in the place of the usual field designation, in the "FORMAT" array (FIG. 28B) and the X and Y designations indicate the location on the check form where it is to be printed. In that no justification is employed when printing the check number, it is possible to insert the value (usually one) by which the check number is to be incremented or decremented in the L, C or R space in the "FORMAT" array. Then, each time the print operation takes place, the check number will be incremented or decremented by the specified value.

Another controlling array in memory is referred to as the "JOB" array. This array is diagrammatically shown in FIG. 28C and allows one to enter and temporarily store console commands. Then, by passing control to the "JOB" array, the previously entered console commands will be executed automatically in sequence. Typically, if one has a routine that is frequently entered via the keyboard 646, this operation can be simplified by placing those commands in the "JOB" array. Then, by merely typing in the character "J" followed by a five-digit Block Identification Number pertaining to that routine, it will be automatically executed.

FIG. 29 illustrates the major activities carried out during the performance of each of the tasks set out in FIG. 27 when those tasks are activated by the Operating System or Nucleus 650. Referring to FIG. 29A, it can be seen that when the task FM PICK 668 is specified, four major activities are executed. First of all, the proper pick timing is determined. That is, the system determines when the next sheet is to be picked so that a predetermined spacing is created between sheets of paper being withdrawn from the Input Hopper trays and deposited on the upper conveyor portion thereof. Secondly, control decides which of the plural hoppers to pick the form from. As indicated above, this is accomplished by virtue of the form name and the information contained in the "CONFIGURE" array defining which hopper that particular form is stored in. Next, the FM PICK task activates the pick arm solenoid 200 (FIG. 8) for a predetermined amount of time such that the sheet of paper is withdrawn from the hopper tray and deposited on the upper conveyor. Typically, the pick operation must be completed within 300 milliseconds. Unless the associated sensor 182 (FIG. 5) is covered by a paper sheet within the 300 millisecond time period allowed, a jam condition is signaled.

Figure 29A:
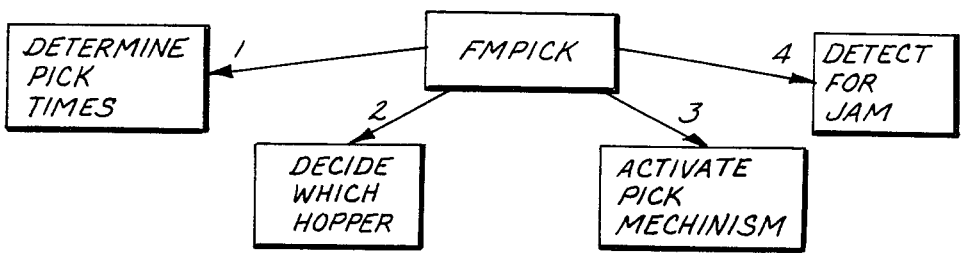
FIGS. 29A through 29N illustrate the functional activities of the software tasks.
Figure 29B:
Figure 29C:

With reference to FIG. 29B, the INPT task 670 is strictly concerned with jam detection in the upper conveyor portion of the Input Hopper section 12. It monitors the flow of paper as it enters the upper conveyor from a hopper tray to the point where it leaves the upper conveyor to enter the alpha/numeric pre-positioner module 64 (FIG. 4). Unless the transfer of a sheet is completed within a prescribed time, a jam indication results. Also, the double pick sensor 241 (FIG. 5) is tied in with the INPT task 670. The double pick sensor comprises a throat of a predetermined dimension greater than the thickness of one sheet but less than the thickness of two. If two sheets are picked due to static electricity or the like, the sensor is activated and the software of the INPT task will detect the condition and signal the "double pick" condition causing the machine to shut down until the jam condition is cleared.

The SNUB task 664 is another jam detection measure but is associated with the alpha/numeric pre-positioner module 64. The SNUB task monitors paper flow exiting from the Input Hopper module to the entry of the page printer. The software makes sure that a sheet of paper entering the pre-positioner module gets to its other end within a predetermined time interval as determined by the Master CPU's internal crystal clock. Unless a sensor positioned proximate the gate 286 senses the presence of paper within an alloted time, a jam condition is signaled and the gate is operated to block paper flow into the A/N printer.

Figure 29D:
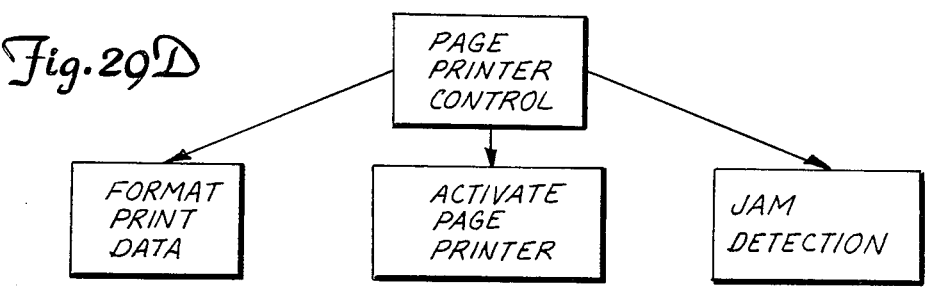
Figure 29E:
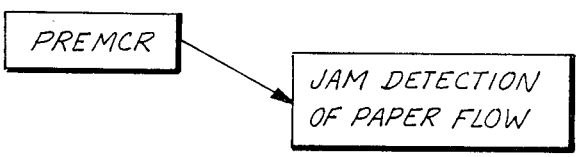

Referring to FIG. 29D, the PAGE PRINTER CONTROL task 676 is executed by the Slave CPU 604 and has three principal functions. The first is to format the print data stored in the "DATA" array (FIG. 28A) using the information stored in the "FORMAT" array (FIG. 28B). The PAGE PRINTER CONTROL task formats the print data before the sheet of paper enters the page printer. When the sheet of paper reaches the end of the pre-positioner module 64 (FIG. 4), the PAGE PRINTER CONTROL task software activates the page printer 66 itself. This is the second of the major functions. The third activity, jam detect, monitors paper entering the page printer and provides a jam detect signal if that sheet does not exit the printer within a prescribed time.

The PREMCR task 662 (FIG. 29E) is also a relatively simple paper flow monitoring task pertaining to that section of the system disposed between the page printer 66 and the MICR module 74. Sensors appropriately place feed signals via the parallel input board 620 and the common bus 600 to the Master CPU to make sure that a given number of sheets will get from one end of the paper transport 70 and 72 to the other in a given amount of time and since there can be more than two sheets of paper in that module, it keeps track of the number of pieces. Should the number exceed two sheets at any time, a jam condition is signaled.

Figure 29F:
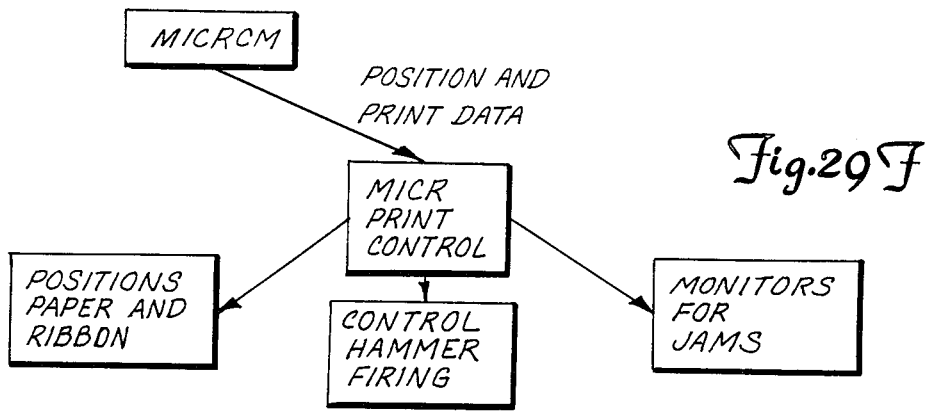

The task MICR CM is graphically broken down into its major activity in the drawing of FIG. 29F. This is a communications task. Its only purpose is to pass data between the Master CPU 602 and the MICR CPU 630. The data in question is both print position data and actual text to be printed. The MICR print control program residing in the memory for the MICR CPU 630 has three major functions. Specifically, it physically positions the paper by controlling the stepper motors associated with the paper and ribbon while sensing the leading edge of the sheet of paper as it progresses through the MICR printer. It positions the paper for each prescribed MICR print line as set out in the "CONFIGURE" array. The MICR print control 674 also controls the application of firing currents to the hammer bank so that the selected characters will be transferred from the MICR ribbon to the paper as the hammers appropriately strike the font embossed on the rotating print drum. The MICR print control 674 also monitors the various paper sensors to detect jam conditions, again on a transit time basis.

The COVER task 666 comprises four major activities as depicted graphically in FIG. 29G. First, it determines which output hopper is to accumulate the documents exiting from the MICR printer, i.e., either the external output hopper or the internal output hopper, and it then switches the diverter mechanism 82 (FIG. 4) to direct the paper into the appropriate transport path. The COVER task 666 also detects for jams in either direction that the paper is made to flow by monitoring paper position with elapsed time. This task also determines which of a plurality of cover hoppers to pick from, if any. When it is desired to select a cover, the task 666 interacts with the FM PICK task 668 so that a gap will be left in the paper flow pattern. Then, when that gap arrives at the appropriate place in the output section, the pick arm associated with the cover hopper will be actuated at the appropriate instant for inserting a cover into the gap created in the paper flow pattern. Sensors at the output of each of the cover hoppers provide an indication as to whether a cover was inserted into the gap in the paper track in time and, if not, a jam condition is signaled.

As was mentioned above, the RUN task 654 (FIG. 29H) serves as a supervisor of all of the so-called track tasks which are also identified in this figure. The track tasks are a collective designation of all of the tasks associated with paper movement. The RUN task is comprised of three major activities. One is to start and stop each of the track tasks. The next is to communicate with the PAGE PRINTER CONTROL program 676 (FIG. 27). The third and last major activity of the RUN task is to monitor for jam conditions being returned from any of the listed track tasks. If one of the track tasks signals a jam, then the RUN task will advise the remaining tasks to shut down.

The INITIALIZE task 652 is fairly straightforward. As can be seen from FIG. 29I, there are two entry points which result in initialization of the system's hardware and software, namely, a "cold reset" which arises upon initial power-up of the machine; or a "warm reset" which can be activated by pressing a button on the operator's console keyboard 42 while the machine is in operation. Upon "cold reset", all of the interrupts as well as all of the programmable hardware in the machine are initialized, the memory is checked and finally a sign-on message is generated before control again returns to the Nucleus. In the case of a "warm reset", there is no need to set up the programmable hardware nor is it necessary to erase and check the memory.

The task, EXEC 656, is always active following power-up. That is to say, the EXEC task (FIG. 29J) has to be "awake" all of the time. It has four major functions. First, it interprets console commands entered from the keyboard 42 and determines what is to be done. That is to say, it determines which of the other tasks must be activated to carry out that particular command. Secondly, it displays machine status by echoing back any command that is given to it. Should there be some problem in executing the command, the EXEC task will provide an indication. However, the actual jam messages emanate from the other individual tasks previously described. The third activity assigned to the EXEC task is to activate the RUN mode. Finally, it can terminate operation on an "ABORT" condition. By activating a particular key on the keyboard 42, the EXEC will be forced into an "ABORT" process where it effectively shuts down every task that is then active or "awake".

The MAINTENANCE task 678 allows the operator, through the keyboard portion of the operator's control station 38, to turn on and off motors, activate and deactivate solenoids and to determine if sensors in the system are operational. Stated otherwise, the MAINTENANCE task (FIG. 29K) allows the human operator to exercise individual pieces of the hardware to determine whether it is properly performing.

The EDIT task (FIG. 29L) is associated with the operator's control station 38 and permits the operator to enter or change data in any one of the four major arrays mentioned above. That is to say, the contents of the "DATA" array, the "CONFIGURE" array, the "FORMAT" array and the "JOB" array may be edited or changed by the operator through the keyboard input device.

With reference to FIG. 29M, the TAPE task 660 merely powers communication between the Tapemaster board and the other hardware modules tied to the common bus by passing commands back and forth between the bus, the tape handler and the Tapemaster 608.

Finally, the MESSAGE CENTER 682 is a task whose sole responsibility is to oversee a predetermined display area on the face on the CRT screen 40 in FIG. 1. The upper third of the screen is reserved for displaying miscellaneous machine status information. For example, it provides a display of how many sheets have been processed through the machine, the last data block read from TAPE, and the last field from the "FORMAT" and "JOB" arrays to have been read and the particular forms which have been assigned to the several hoppers and, finally, whether the information is recorded on the TAPE in EBCDIC code or in ASCII code.

From the foregoing description of the hardware and software organization, the priority assignments and the manner in which the individual tasks are partitioned for execution under control of the operating system, it is believed that persons skilled in programming will be in a position to prepare detailed machine coding for causing the various microprocessors included in the system to issue commands at the appropriate times for actuating solenoids, operating motors and for reading data from various sensors associated with the paper transport tracks. Hence, it is considered unnecessary to encumber the specification with lists of such coding.

The invention has been described herein in considerable detail in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. A system for printing and assembling business documents, comprising:

(a) a stationary frame;
   (b) means for holding a plurality of stacks of paper sheet stock upon which characters are to be printed, each of said stacks containing sheet stock of the same characteristic but differing from the characteristic of sheet stock in other of said stacks, said means for holding said plurality of stacks being mounted on said frame;
   (c) a first printing station having a printing apparatus thereat for printing alpha/numeric characters, said printing apparatus having a paper inlet and a paper outlet;
   (d) first paper transfer means for transferring paper sheets drawn from said means for holding a plurality of stacks of paper sheet stock to said first printing station, said first paper transfer means including sheet aligning means for orienting paper sheets for entry into said paper inlet of said printing apparatus;
   (e) paper pick means operatively coupled to said means for holding a plurality of stacks of paper sheet stock and, when actuated, for selectively extracting paper sheets, one at a time, from ones of said plurality of stacks of paper sheet stock and depositing the selected sheets of said paper transfer means in serial order;
   (f) a second printing station having printing means thereat for printing magnetic ink characters at predetermined locations on said paper sheets;
   (g) second paper transfer means disposed between said paper outlet of said printing apparatus at said first printing station and said second printing station for transporting the paper sheets exiting said paper outlet of said printing apparatus at said first printing station and orienting said paper sheets along a longitudinal axis of said second paper transfer means for entry into said second printing station; and
   (h) microprocessor means including memory means, said memory means storing (i) a program of instructions executable by said microprocessor means, (ii) a first addressable array containing the data defining the symbols to be printed at said first and second printing stations, (iii) a second addressable array containing data defining the printing format and locations on said paper sheets where said symbols are to be placed, and (iv) a third addressable array containing data defining the identification of the characteristics of the sheet stock contained in each of said plurality of stacks, said microprocessor means further including (i) means responsive to said program of instructions for sending control signals to said paper pick means for selecting sheets of a desired characteristic from said stacks in a prearranged order determined by the contents of said third addressable array, (ii) means responsive to said program of instructions for sending control signals to said first and second paper transfer means for transporting the selected sheets in a timed serial order to said first and second printing stations, and (iii) means responsive to the contents of said first array for sending control signals to said first and second printing stations for printing predetermined symbols on said sheets at predetermined locations defined by the contents of said second array.

2. The system for printing business documents as in claim 1 wherein said means for holding a plurality of stacks of paper sheet stock comprises a plurality of paper trays for containing said stacks of paper sheet stock.

3. The printing system for printing business documents as in claim 2 wherein said paper pick means comprises:

(a) a plurality of driven friction rollers normally disposed in a close but non-contact relationship with an outer paper sheet in a corresponding plurality of said stacks of sheet stock in said plurality of paper trays; and
   (b) electronically controlled means responsive to one of said control signals sent to said paper pick means for moving a selected one of said plurality of driven friction rollers into contact with said outer paper sheet in only one of said plurality of trays.

4. The system for printing business documents as in claim 3 and further including buckle fold arm members disposed on said trays for limiting to one the number of sheets extracted from a stack of paper sheet stock during engagement of said selected one of said driven friction rollers with said outer paper sheet.

5. The system for printing business documents as in claim 1 wherein said first paper transfer means comprises a plurality of motor-driven pinch roller assemblies, each such pinch roller assembly comprising a lower motor driven roller disposed on a flexible shaft and cooperating with a juxtaposed idler roller, said idler roller being castor mounted, said pinch roller assemblies being skewed at a predetermined angle with respect to the longitudinal axis of said paper transfer means.

6. The system for printing business documents as in claim 5 wherein said sheet aligning means of said first paper transfer means further includes a reference edge member aligned with said paper inlet of said printing apparatus, said pinch roller assemblies steering said extracted sheets against said reference edge member.

7. The system for printing documents as in claim 1 and further including sensor means associated with said first paper transfer means for sensing the transit time of extracted sheets along said first paper transfer means, said sensor means being coupled to said microprocessor means.

8. The system for printing documents as in claim 1 and further including mechanical sensor means having a gap which is greater in height than the thickness of one sheet, but less than the thickness of two sheets, said gap being disposed proximate said paper outlet of said first paper transfer means for detecting the presence of multiple overlapped extracted sheets, and means coupling said sensor means to said microprocessor means.

9. The system for printing business documents as in claim 8 wherein said microprocessor means is responsive to said sensor means for stopping said first paper transfer means when multiple sheets are sensed.

10. The system for printing business documents as in claim 1 wherein said printing apparatus at said first printing station comprises a non-impact, electrostatic, ion-imaging, dot-matrix page printer.

11. The system for printing business documents as in claim 10 and further including random access memory means coupled to said microprocessor means; magnetic tape storage means for storing a plurality of blocks of data to be printed; means controlled by said microprocessor means for transferring selected ones of said plurality of blocks of data from said magnetic tape storage means to said random access memory means; and means communicating with said random access memory means for presenting electrical signals indicative of characters to be printed to said page printer.

12. The system for business documents as in claim 11 and further including a plurality of read only memory devices addressable by said microprocessor means for storing digital signals defining logos to be printed by said page printer.

13. The system for printing documents as in claim 1 wherein said second paper sheet transfer means comprises:
 (a) a generally horizontal surface having a plurality of apertures formed therethrough, said apertures being disposed along a line which is at a predetermined acute angle with respect to said longitudinal axis of said second paper sheet transfer means;
 (b) a plurality of friction rollers individually mounted on flexible, rotatable shafts, a predetermined arc of each of said rollers extending through an individual one of said plurality of apertures;
 (c) a hinged cover member including a flat sheet member having a plurality of apertures therethrough which are vertically aligned with said apertures in said generally horizontal surface when said hinged cover member is closed;
 (d) a plurality of pinch rollers castor mounted within said cover with a predetermined arc of each pinch roller extending through a separate one of said plurality of apertures in said flat sheet member so as to contact a corresponding one of said plurality of friction rollers; and
 (e) means for driving said flexible rotatable shafts in unison.

14. The system for printing documents as in claim 13 and further including means on said castor mountings for adjusting the pressure with which said pinch rollers contact said friction rollers.

15. The system for printing documents as in claim 13 wherein said second paper transfer means further include a reference edge member extending longitudinally along one side of said generally horizontal surface, said line being directed toward said reference edge member.

16. The system for printing business documents as in claim 13 wherein said second paper transfer means further includes an arcuate extension to said generally horizontal surface and said flat sheet member for creating a paper flow transition from horizontal to vertical.

17. The system for printing documents as in claim 16 wherein said arcuate extension is supported on said frame by means of a plurality of transversely extending chuck-supported shafts.

18. The system for printing business documents as in claim 17 wherein said arcuate extension of said second paper transfer means includes means for adjusting the transverse position thereof along said chuck-supported shafts.

19. The system for printing documents as in claim 1 wherein said printing means at said second printing station comprises an impact-type drum printer.

20. The system for printing documents as in claim 19 wherein said impact-type drum printer comprises:
 (a) a hammer bank including a plurality of print hammers disposed in side-by-side relationship along a transverse line;
 (b) means for receiving individual paper sheets seriatim from said second paper transfer means and advancing said sheets step-by-step past said hammer blank;
 (c) motor-driven magnetic ink ribbon supply and take-up reels spaced apart from one another to define a span of ribbon of a predetermined length;
 (d) means controlled by said microprocessor means for moving said ribbon step-by-step; and
 (e) a continuously rotating drum having a predetermined font of raised characters on the surface thereof, said drum being journaled for rotation in close but non-contact relation to said span of ribbon whereby actuation of said hammers brings said paper sheet, said ribbon and said drum into momentary contact.

21. The system for printing documents as in claim 20 and further including a face plate member disposed between said hammer bank and said ribbon span, said face plate having a pattern of windows formed therethrough through which a portion of said print hammers may pass and further means formed in said face plate for preventing said paper sheets from catching on an edge of said windows.

22. A system for printing business documents as in claim 1 and further including output hopper means coupled to said second printing station for storing printed paper sheets exiting from said second printing station.

23. The system for printing business documents as in claim 22 wherein said output hopper means comprises first and second paper sheet collection trays and electronically actuated diverter means for steering paper sheets to one or the other of said first and second paper sheet collection trays.

24. The system for printing business documents as in claim 23 and further including means for selectively perforating paper sheets being steered by said diverter means to one of said first and second paper sheet collection trays.

25. The system for printing business documents as in claim 24 wherein said means for selectively perforating paper sheets comprises:

(a) a cylindrical anvil journaled for rotation on said frame on an axis transverse to the direction of paper flow;

(b) means for rotating said anvil;

(c) at least one knife wheel having a serrated periphery journaled for rotation about an axis which is parallel to said axis of said cylindrical anvil; and (d) means for selectively bringing the periphery of said knife wheel into contact with said cylindrical anvil.

26. The system for printing business documents as in claim 25 and further including means for adjusting the lateral positioning of said knife wheel.

27. The system for printing business documents as in claim 20 wherein said ribbon supply and take-up reels, said means for moving said ribbon step-by-step and said continuously rotating drum are supported on a sub-frame member hingedly secured to said frame whereby said sub-frame can be swung outwardly of said frame.

28. The system for printing documents as in claim 27 and further including latch means on said sub-frame for positively locking said sub-frame in a closed position relative to said frame.

* * * * *